US012255839B2

(12) United States Patent
Harada et al.

(10) Patent No.: US 12,255,839 B2
(45) Date of Patent: Mar. 18, 2025

(54) USER TERMINAL AND RADIO COMMUNICATION METHOD

(71) Applicant: NTT DOCOMO, INC., Tokyo (JP)

(72) Inventors: Hiroki Harada, Tokyo (JP); Daisuke Murayama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 744 days.

(21) Appl. No.: 17/430,205

(22) PCT Filed: Feb. 14, 2019

(86) PCT No.: PCT/JP2019/005446
§ 371 (c)(1),
(2) Date: Aug. 11, 2021

(87) PCT Pub. No.: WO2020/166041
PCT Pub. Date: Aug. 20, 2020

(65) Prior Publication Data
US 2022/0166576 A1    May 26, 2022

(51) Int. Cl.
*H04L 5/00*    (2006.01)

(52) U.S. Cl.
CPC .......... *H04L 5/0048* (2013.01); *H04L 5/0053* (2013.01)

(58) Field of Classification Search
CPC ... H04L 5/0048; H04L 5/0053; H04L 5/0051; H04L 5/0005; H04L 5/001; H04L 27/0006; H04W 16/14
See application file for complete search history.

(56) References Cited

U.S. PATENT DOCUMENTS

| | | | |
|---|---|---|---|
| 2016/0344526 A1* | 11/2016 | Fan | H04W 72/21 |
| 2017/0142751 A1* | 5/2017 | Liu | H04L 27/2613 |
| 2018/0220462 A1 | 8/2018 | Kusashima et al. | |
| 2019/0174461 A1* | 6/2019 | Wang | H04L 5/0064 |
| 2021/0351865 A1* | 11/2021 | Ouchi | H04W 8/24 |

OTHER PUBLICATIONS

Extended European Search Report issued in European Application No. 19915351.1, dated Aug. 2, 2022 (7 pages).
Panasonic; "Wideband Operation in NR Unlicensed"; 3GPP TSG-RAN WG1 Meeting #94bis, R1-1811095; Chengdu, China; Oct. 8-12, 2018 (3 pages).
InterDigital, Inc.; "NR-U Wide-Band Operation"; 3GPP TSG-RAN WG1 Ad-Hoc Meeting 1901, R1-1900771; Taipei, Taiwan; Jan. 21-25, 2019 (3 pages).

(Continued)

*Primary Examiner* — Jung Liu
(74) *Attorney, Agent, or Firm* — Osha Bergman Watanabe & Burton LLP

(57) ABSTRACT

A user terminal has a control section that makes a determination of at least one of a band of monitoring for at least one of a reference signal and a downlink control channel, and operation of the monitoring, in a frequency band to which sensing of a channel is applied, based on at least one of notified configuration information and reported capability information, and a receiving section that performs the monitoring according to the determination. According to one aspect of the present disclosure, it is possible to perform proper communication in an unlicensed band.

4 Claims, 8 Drawing Sheets

(56) References Cited

OTHER PUBLICATIONS

ITRI; "DL Control Information to Facilitate Wideband Operation in NR-U"; 3GPP TSG-RAN WG1 Ad-Hoc Meeting 1901, R1-1900987; Taipei, Taiwan; Jan. 21-25, 2019 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
International Search Report issued in corresponding International Application No. PCT/JP2019/005446, mailed on Apr. 23, 2019 (4 pages).
Written Opinion issued in corresponding International Application No. PCT/JP2019/005446, mailed on Apr. 23, 2019 (4 pages).
Office Action issued in the counterpart Japanese Patent Application No. 2020-572022, mailed on Jan. 10, 2023 (8 bages).
Nokia, Nokia Shanghai Bell; "On wideband operation in NR-U"; 3GPP TSG RAN WG1 Meeting AH-1901, R1-1900349; Taipei, Taiwan; Jan. 21-25, 2019 (8 pages).

\* cited by examiner

USER TERMINAL AND RADIO COMMUNICATION METHOD

TECHNICAL FIELD

The present disclosure relates to a user terminal and radio communication method in the next-generation mobile communication system.

BACKGROUND ART

In Universal Mobile Telecommunications System (UMTS) networks, for the purpose of higher data rates, low delay and the like, Long Term Evolution (LTE) has been specified (Non-patent Document 1). Further, for the purpose of higher capacity, more sophistication and the like than LTE (Third Generation Partnership Project (3GPP) Release (Rel.) 8, 9), LTE-Advanced (3GPP Rel. 10-14) has been specified.

Successor systems (e.g., also referred to as 5th generation mobile communication system (5G), 5G plus (+), New Radio (NR), 3GPP Rel.15 onward, etc.) to LTE have also been studied.

In the existing LTE system (e.g., Rel.8-12), specifications were made on the assumption that exclusive operation is performed in a licensed frequency band (also referred to as a licensed band, licensed carrier, licensed component carrier (licensed CC), etc.) of a telecommunications carrier (operator). As the licensed CC, for example, 800 MHz, 1.7 GHz, 2 GHz and the like are used.

Further, in the existing LTE system, (e.g., Rel. 13), in order to extend the frequency band, the system supports use of a frequency band (also referred to as an unlicensed band, unlicensed carrier, unlicensed CC) different from the above-mentioned licensed band. For example, as the unlicensed band, a 2.4 GHz-band, 5 GHz-band and the like are assumed where it is possible to use Wi-Fi (Registered Trademark) and Bluetooth (Registered Trademark).

Specifically, Rel.13 supports Carrier Aggregation (CA) for aggregating a carrier (CC) of the licensed band and a carrier (CC) of the unlicensed band. Communication thus using the unlicensed band together with the licensed band is referred to as License-Assisted Access (LAA).

Also in future radio communication systems (e.g., also referred to as 5G, 5G+, NR, 3GPP Rel.15 onward, etc.), it is studied to use the unlicensed band. In the future, there is a possibility that Dual Connectivity (DC) of the licensed band and the unlicensed band and Stand-Alone (SA) of the unlicensed band are also targets for studies in the future radio communication system.

PRIOR ART DOCUMENT

Non-Patent Document

[Non-patent Document 1] 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

DISCLOSURE OF INVENTION

Problems to be Solved by the Invention

In the future radio communication system (e.g., 5G, 5G+, NR, 3GPP Rel.15 onward), before transmitting data in the unlicensed band, a transmitting apparatus (e.g., base station on downlink (DL), user terminal on uplink (UL)) performs listening (also called Listen Before Talk (LBT), Clear Channel Assessment (CCA), carrier sense, sensing of a channel, channel access procedure or the like) to ascertain the presence or absence of transmission of another apparatus (e.g., base station, user terminal, Wi-Fi apparatus, etc.).

In order for such a radio communication system to coexist with another system in the unlicensed band, it is considered to conform to regulation or requirement in the unlicensed band.

However, unless operation in the unlicensed band is determined clearly, there is the risk that proper communication is not performed in the unlicensed band such that operation in a particular communication situation does not conform to the regulation, and that usage efficiency of radio resources is decreased.

Therefore, in the present disclosure, it is an object no provide a user terminal and radio communication method for performing proper communication in the unlicensed band.

Means for Solving the Problem

A user terminal according to one aspect of the present disclosure is characterized by having a control section that makes a determination of at least one of a band of monitoring for at least one of a reference signal and a downlink control channel, and operation of the monitoring, in a frequency band to which sensing of a channel is applied, based on at least one of notified configuration information and reported capability information, and a receiving section that performs the monitoring according to the determination.

Advantageous Effect of the Invention

According to one aspect of the present disclosure, it is possible to perform proper communication in the unlicensed band.

BEST MODE FOR CARRYING OUT THE INVENTION

<Unlicensed Band>

Figure 1:
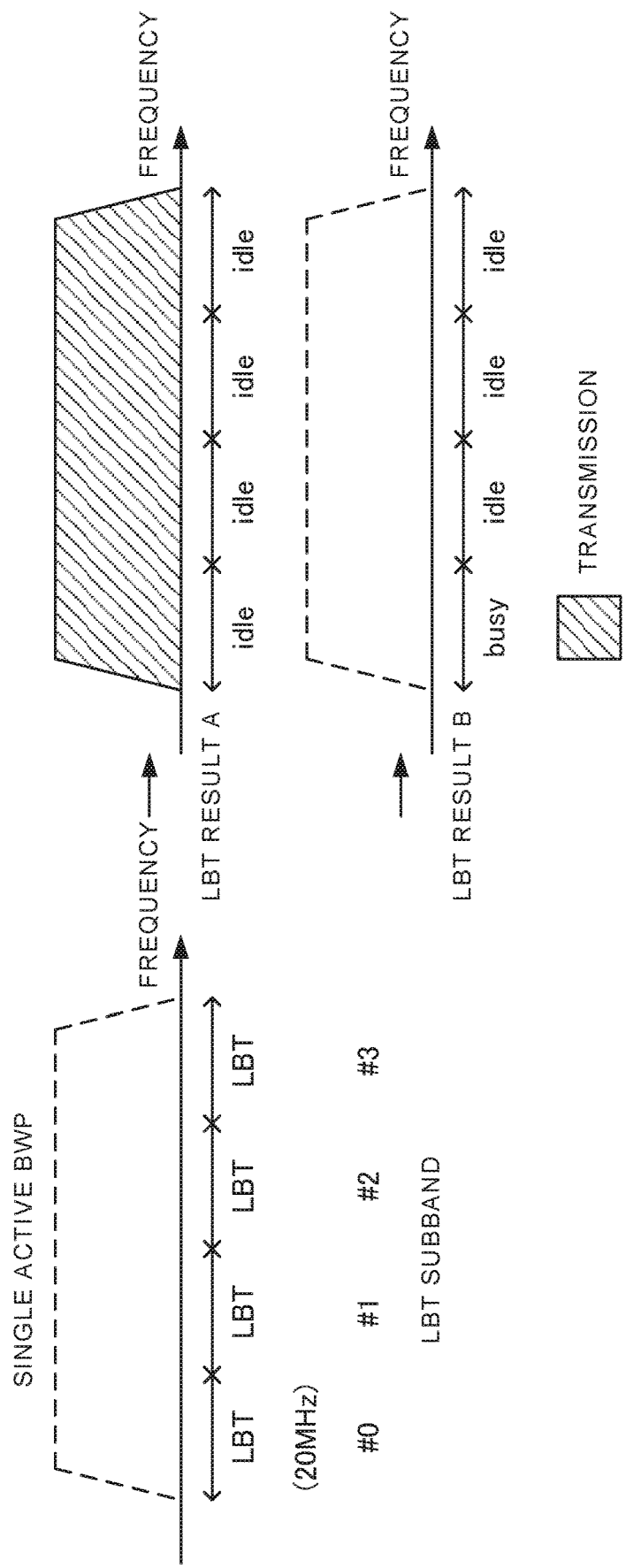
FIG. 1 is a diagram showing one example of a first downlink transmission method.

In the unlicensed band (e.g., 2.4 GHz-band and 5 GHz-band), since coexistence of a plurality of systems is expected such as, for example, a Wi-Fi system and system (LAA system) for supporting LAA, it is considered that collision avoidance and/or interference control is necessary in transmission among the plurality of systems.

For example, in the Wi-Fi system using the unlicensed band, Carrier Sense Multiple Access (CSMA)/Collision Avoidance (CA) is adopted for the purpose of avoiding collision and/or controlling interference. In CSMA/CA, a given time Distributed access Inter Frame Space (DIFS) is provided before transmission, and a transmitting apparatus performs data transmission after ascertaining (carrier sense) the absence of another transmission signal. Further, after transmitting the data, the transmitting apparatus waits for ACKnowledgement (ACK) from a receiving apparatus. In the case where the transmitting apparatus is not capable of receiving ACK within a given time, the transmitting apparatus determines that a collision occurs, and performs retransmission.

In LAA of the existing LTE system (e.g., Rel.13), before transmitting data in the unlicensed band, a transmitting apparatus of the data performs listening (Listen Before Talk (LBT), Clear Channel Assessment (CCA), carrier sense, sensing of a channel, sensing, channel access procedure) to ascertain the presence or absence of transmission of another apparatus (e.g., base station, user terminal, Wi-Fi apparatus, etc.).

For example, the transmitting apparatus may be a base station (e.g., gNB: gNodeB) on downlink (DL), and may be a user terminal (e.g., User Equipment (UE)) on uplink (UL). Further, for example, the receiving apparatus that receives the data from the transmitting apparatus may be a user terminal on DL, and may be a base station on UL.

In LAA of the existing LTE system, the transmitting apparatus starts data transmission a given time period (e.g., immediately after, or time period of back-off) later after detecting no transmission (idle state) of another apparatus in LBT.

As a channel access method in LTE LAA, the following four categories are defined.

Category 1: A node performs transmission without performing LBT.

Category 2: A node performs carrier sense in a fixed sensing time before transmission, and in the case where a channel is available, performs transmission.

Category 3: A node generates a value (random back-off) randomly in a given range before transmission, performs repeatedly carrier sense in a fixed sensing slot time, and in the case where the node is capable of ascertaining that a channel is available over a slot of the value, performs transmission.

Category 4: A node generates a value (random back-off) randomly in a given range before transmission, performs repeatedly carrier sense in a fixed sensing slot time, and in the case where the node is capable of ascertaining that a channel is available over a slot of the value, performs transmission. Corresponding to a communication failure condition due to contention with communication of another system, the node changes a range (contention window size) of the random back-off value.

As LBT regulation, it is studied to perform LBT corresponding to a length of a gap (non-transmission time period, time period where received power is a given threshold or less, etc.) between two transmissions.

An NR system using the unlicensed band may be called an NR-Unlicensed (U) system, NR LAA system and the like. In NR-U, there is a possibility of also adopting Dual Connectivity (DC) of the licensed band and the unlicensed band, Stand-Alone (SA) of the unlicensed band and the like.

In NR-U, in the case where the LBT result, is idle, the base station (e.g., gNB) or UE acquires a Transmission Opportunity (TxOP) to perform transmission. In the case where the LBT result is busy (LBT-busy), the base station or the UE does not perform transmission. The time of the Transmission Opportunity is called Channel Occupancy Time (COT).

It is studied that NR-U uses a signal including at least a Synchronization Signal (SS)/Physical Broadcast CHannel (PBCH) block (SS block (SSB)). In unlicensed band operation using this signal, the following matters are studied.

No gap within a time range in which the signal is transmitted in at least one beam Meet an occupancy bandwidth Minimize a channel occupancy time of the signal Characteristics for facilitating prompt channel access Further, it is studied to use a signal including Channel State information (CSI)-Reference Signal (RS), an SSB burst set (set of SSBs), and a control resource set (COntrol REsource SET: CORESET) and PDSCH associated with the SSB in a single contiguous burst signal. The signal may be called a discovery reference signal (Discovery Reference Signal (DRS), NR-U DRS, etc.).

The CORESET associated with the SSB may be called Remaining Minimum System Information (RMSI)-CORESET, CORESET #0 and the like. The RMSI may be called System Information Block 1 (SIB1). A PDSCH associated with the SSB may be a PDSCH (RMSI PDSCH) for carrying the RMSI, or may be a PDSCH scheduled using a PDCCH (DCI having CRC scrambled by System Information (SI)-Radio Network Temporary Identifier (RNTI)) within RMSI-CORESET.

SSBs having different SSB indexes may be transmitted using different beams (base station transmission beams). The SSB, and RMSI PDCCH and RMSI PDSCH corresponding thereto may be transmitted using the same beam.

In order to coexist with another system or another operator, after ascertaining that a channel is available (idle) by LBT, a node (e.g., base station, UE) in NR-U starts transmission.

After succeeding in LBT, the node may continue transmission for a certain time period after starting transmission. In addition, in the case where communication is disconnected beyond a given gap period during the transmission, since there is a possibility that another system uses the channel, LBT is required again before next transmission. A transmission continuation-capable time period is dependent on a priority class in a used LBT category or LBT. The priority class may be a contention window size for random back-off and the like. As an LBT time period is shorter (the priority class higher), the transmission continuation-capable time is shorter.

The node needs to transmit in a wideband, according to the transmission bandwidth regulation in the unlicensed band. For example, the transmission bandwidth regulation in Europe is 80% or more of a system bandwidth. There is a possibility that transmission in a narrowband is not detected by another system or another operation for performing LBT in a wideband, and collides.

The node preferably performs transmission a time as short as possible. When each of a plurality of coexisting systems shortens the channel occupancy time, the plurality of systems is capable of efficiently sharing resources.

The base station in NR-U preferably transmits an SSB of a different beam (beam index, SSB index), and RMSI PDCCH (PDCCH for scheduling RMSI PDSCH) and RMSI PDSCH associated with the SSB within a time as short as possible, using a wideband as possible. By this means, the base station is capable of applying a high priority class (LTB category of a short LBT time period) to SSB/RMSI (DRS) transmission, and is capable of expecting LBT success with a high probability. By transmitting in a wideband, the base station is easy to meet the transmission bandwidth regulation. Further, by transmitting in a shirt time, the base station is capable of avoiding that transmission is disconnected.

It is studied that a bandwidth (UE channel bandwidth) of initial downlink (DL) bandwidth part (BWP) for NR-U is set at 20 MHz. This is because the channel bandwidth of Wi-Fi that is the coexisting system is 20 MHz. In this case, it is necessary that the SSB, RMSI PDCCH and RMSI PDSCH are included in the 20 MHz-bandwidth.

In an NR-U DRS, by a gap not existing within a transmission time interval of at least one beam, it is possible to prevent another system from interrupting the transmission time interval.

The NR-U DRS may be transmitted periodically, irrespective of whether or not a UE in an active state and/or a UE in an idle state exists. By this means, the base station is capable of periodically performing transmission of a signal required for channel access procedure, using simple LBT, and the UE is capable of accessing a cell of NR-U promptly.

In the NR-U DRS, in order to limit the number of required channel accesses and actualize a short channel occupancy time, the signal is packed in a short time. The NR-U DRS may support Stand-Alone (SA) of NR-U.

<Wideband Operation>

With respect to both downlink (DL) and uplink (UL), bandwidths wider than 20 MHz may be supported in a plurality of serving cells. In NR-U, it is studied to support that the serving cell is configured for bandwidth wider than 20 MHz.

For DL operation, the next Options are studied in bandwidth part (BWP)-based operation in a carrier having a bandwidth wider than 20 MHz.

Option 1a: A plurality of BWPs is configured, a plurality of BWPs is activated, and the PDSCH is transmitted in one or more BWPs.

Option 1b: A plurality of BWPs is configured, plurality of BWPs is activated, and the PDSCH is transmitted in a single BWP.

Option 2: A plurality of BWPs is configured, a single BWP is activated, and in the case where the base station succeeds in Clear Channel Assessment (CCA) of the entire BWP, the PDSCH is transmitted in the BWP.

Option 3: A plurality of BWPs is configured, a single BWP is activated, and the PDSCH is transmitted in a portion of the BWP where the base station succeeds in Clear Channel Assessment (CCA).

Herein, CCA may be determined for each band of 20 MHz.

In order to detect a transmission burst from the serving base station, the UE may assume existence of a signal such as the DMRS in the PDCCH or group common (GC)-PDCCH. The PDCCH may be a PDCCH for one UE (UE-specific PDCCH, Regular PDCCH). The GC-PDCCH may be a common PDCCH (UE group common-PDCCH) to one or more UEs.

In the unlicensed band, since there is the case where a transmission burst is not transmitted regularly due to LBT, to reduce power consumption of a UE, it may not be required to perform blind decoding (blind detection) to detect the transmission burst. The UE first performs DMRS detection, and in the case of detecting the DMRS, may perform blind decoding. Such two-step blind decoding using DMRS detection may not be indispensable for the UE.

Among the above-mentioned Options, in Options 2 and 3 using a single active BWP as Rel. 15 NR, impacts on specifications are small.

As shown in FIG. 1 (transmission spectrum), in the case where a single active BWP includes 4 LBT subbands, and Option 2 (first downlink transmission method) is applied, the base station performs LBT in each of 4 LBT subbands, and in the case where all LBT results are idle (success) (LBT result A), is capable of performing transmission in the active BWP. In the case where the LBT result is busy (failure) in any of the subbands (LBT result B), the base station does not perform transmission in the active BWP.

Figure 2:
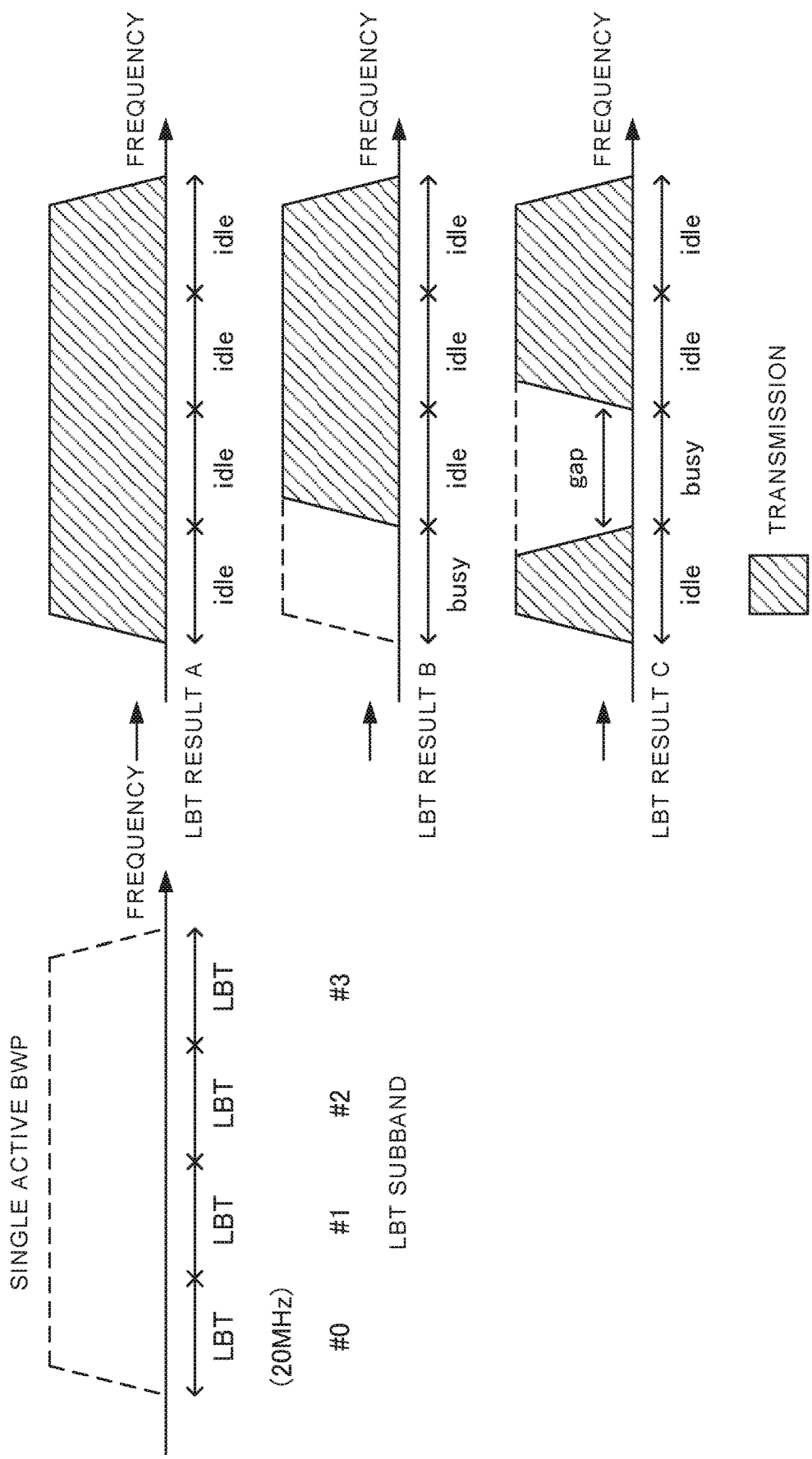
FIG. 2 is a diagram showing one example of a second downlink transmission method.

As shown in FIG. 2 (transmission spectrum), in the case where a single active BWP includes 4 LBT subbands, and Option 3 (second downlink transmission method) is applied, the base station performs LBT in each of 4 LBT subbands, and in the case where all LBT results are idle, is capable of performing transmission in the active BWP. In the case where the LBT result is busy in any of the subbands, the base station is capable of performing transmission in subbands except the subband. Herein, it is assumed that the single active BWP includes 4 contiguous subbands #0, #1, #2 and #3. In the case where the LBT results in all subbands #0 to #3 are idle (LBT result A), the base station is capable of performing transmission in the contiguous subbands #0 to #3. In the case where only the LBT result in the subband #0 is busy (LBT result B), the base station is capable of performing transmission in the contiguous subbands #1, #2 and #3. In the case where only the LBT result in the subband #1 is busy (LBT result C), the base station is capable of performing transmission in the subbands #0, #2 and #3. A band between the subbands #0 and #2 is a gap, and a transmission-capable band is discontiguous.

In the case of supporting at least one of the first downlink transmission method and the second downlink transmission method, specific UE operation, required notification and the like are not clear.

In the second downlink transmission method, when a transmission band of a first PDCCH in a transmission burst varies with an LBT result by a base station (e.g., gNB), it is not obvious how the UE performs blind decoding on the PDCCH. In the second downlink transmission method, it is not obvious whether to support all combinations of LBT subbands. For example, a size of the transmission band, the number of LBT subbands, a size of the chap between LBT subbands, the number of gaps and the like are not clear. When the UE performs blind decoding on all candidates for combinations of LBT subbands, the processing is complicated, and the load is high.

In the second downlink transmission method, when a transmission band of at least one of the PDCCH and the PDSCH varies with the LBT result by the base station, and processing is performed to allocate resources of the transmission band corresponding to the LBT result to at least one of the PDDCH and the PDSCH (map at least one of the PDDCH and the PDSCH to the transmission band corresponding to the LBT result), the processing delay occurs. It is also considered that the processing delay differs corresponding to a combination of LBT subbands. The base station is required to perform processing for determining bands of the PDCCH and PDSCH corresponding to the LBT result, and determining resource allocation information of the PDSCH in DCI in the PDCCH. By the processing, it is considered that the delay occurs between LBT and transmission of the PDCCH. In order to reduce the processing delay, it is considered that the base station prepares candidates for PDCCHs that correspond to all combinations of the LBT result, but the scale is increased.

In the first downlink transmission method, there is no issue (blinding decoding, processing delay) of the second downlink transmission method, and it is possible to suppress the load of the UE. However, unless it is possible to recognize that either of the first downlink transmission method and the second downlink transmission method is applied, there is the risk that the UE performs unnecessary operation.

Thus, in NR-U target frequencies, unless operation is clarified for at least one of the first downlink transmission method and the second downlink transmission method, the UE is not capable of properly receiving the downlink signal.

Therefore, the inventors of the present invention conceived a method of appropriately receiving downlink signals using a band wider than a given bandwidth in NR-U target frequencies. The given bandwidth may be a bandwidth of a given coexisting system. For example, the given bandwidth may be 20 MHz.

Embodiments according to the present disclosure will be described below in detail with reference to drawings. A radio communication method according to each of the Embodiments may be applied alone, or may be applied in combination.

In the present disclosure, the frequency, band, spectrum, carrier, component carrier (CC), and cell may be read with one another.

In the present disclosure, the NR-U target frequency, unlicensed band, unlicensed spectrum, LAA SCell, LAA cell, primary cell (Primary Cell: PCell, Primary Secondary Cell: PSCell, Special Cell: SpCell), secondary cell (Secondary Cell: SCell), and frequency band to which sensing of a channel is applied may be read with one another.

In the present disclosure, an NR target frequency, licensed band, licensed spectrum, PCell, PSCell, SpCell, SCell, non-NR-U target frequency, Rel. 15, NR, and frequency band to which sensing of a channel is not applied may be read with one another.

Different frame structures may be used in the NR-U target frequency and NR target frequency.

Radio communication systems (NR-U, LAA system) may conform to (support the first radio communication standard) the first radio communication standard (e.g., NR, LTE, etc.).

Another system (coexisting system, coexisting apparatus) and another radio communication apparatus (coexisting apparatus) coexisting with the radio communication system may conform to (support the second radio communication standard) the second radio communication standard, such as Wi-Fi, Bluetooth (Registered Trademark), WiGig (Registered Trademark), radio LAN (Local Area Network), IEEE 802.11, LPWA (Low Power Wide Area) and the like, different from the first radio communication standard. The coexisting system may be a system undergoing interference from the radio communication system, or may be a system for imposing interference on the radio communication system.

In the present disclosure, at least one of the PDCCH and GC-PDCCH may be called simply a PDCCH. A DMRS for at least one of the PDCCH and GC-PDCCH may be called a DMRS for PDCCH, DMRS and the like.

In the present disclosure, the LBT subband, part of active DL BWP, subband and partial band may be read with one another.

In the present disclosure, the first downlink transmission method and second downlink transmission method may be distinguished corresponding to the type, mode and like.

(Radio Communication Method)

Embodiment 1

In the case of applying the first downlink transmission method in the NR-U target frequency, a UE may perform detection of a DMRS for a PDCCH (at least one of the PDCCH and GC-PDCCH) within an active DL BWP. The first downlink transmission method may be a downlink transmission method where a band of monitoring for at least one of the PDCCH and DMRS for the PDCCH is a CORESET band configured by the base station, Option 2 described previously and the like.

The UE may be configured for a CORESET within a DL BWP. The UE may perform PDCCH monitoring in a CORESET configured within an active DL BWP.

Figure 3:
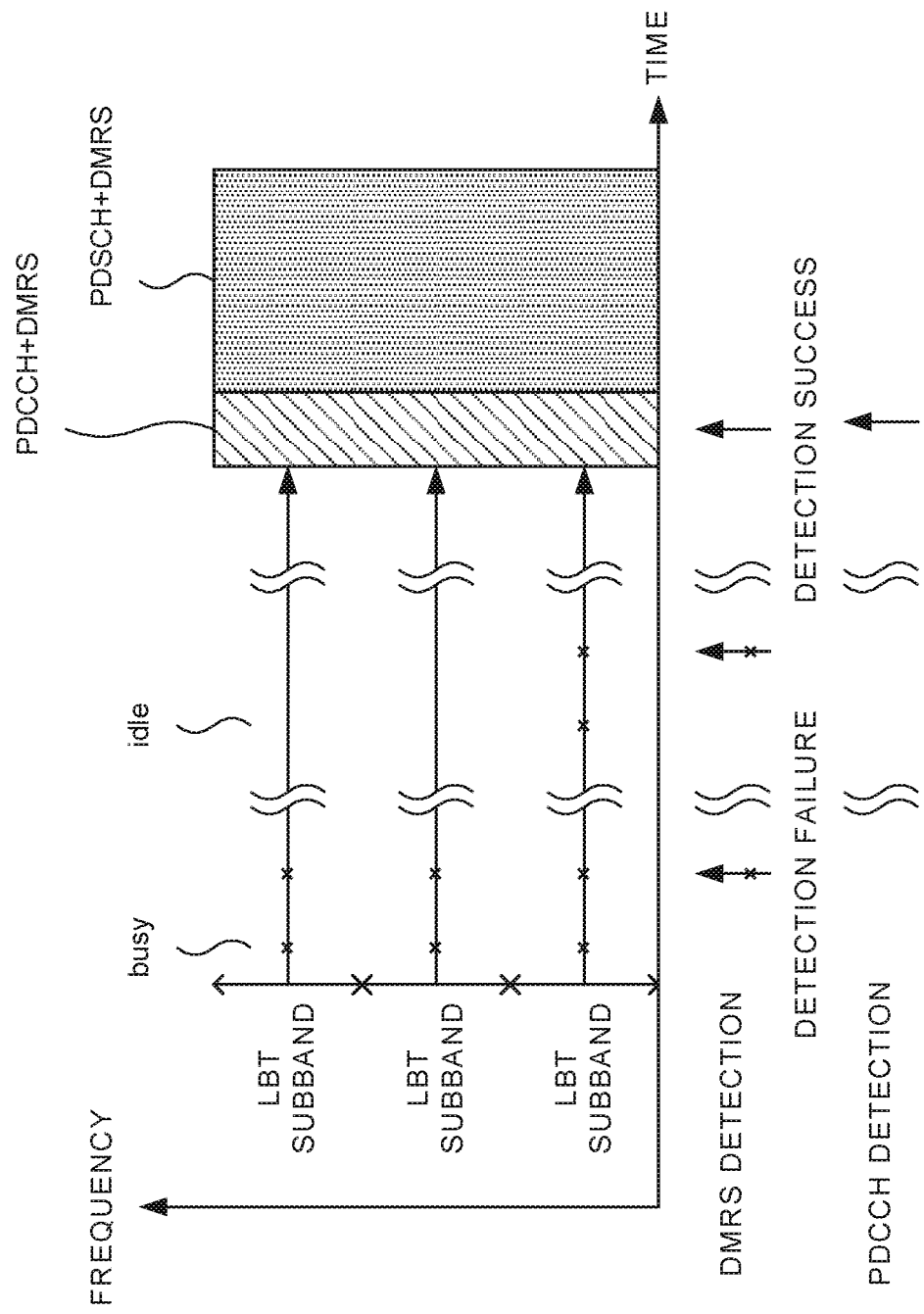
FIG. 3 is a diagram showing one example of UE operation according to Embodiment 1.

As shown in FIG. 3, the UE may perform DMRS detection with a particular periodicity. The particular periodicity may be defined by specifications, may be configured by higher layer signaling, or may be dependent on UE implementation. The particular periodicity may be designated by the number of symbols, or may be designated by the number of slots. The UE may perform DMRS detection within an active DL BWP or in a CORESET configured within the active DL BWP.

When the UE detects a DMRS, the UE may assume that DL transmission (transmission burst) of the serving cell exists from the DMRS. When the UE detects the DMRS, the UE may perform blind detection of the PDCCH in the CORESET configured within the active DL BWP.

According to Embodiment 1 as described above, the UE is capable of properly operating according to the first downlink transmission method. Further, according to the first downlink transmission method, as compared with the second downlink transmission method, it is possible to suppress loads of the UE.

Embodiment 2

«DMRS Detecting Method»

In the case of applying the second downlink transmission method in the NR-U target frequency, a UE may perform detection (DMRS detection, DMRS monitoring) of a DMRS for a PDCCH (at least one of the PDCCH and GC-PDCCH) in a part or the whole of LBT subbands within an active DL BWP. The second downlink transmission method may be a downlink transmission method where a monitoring band for at least one of the PDCCH and DMRS for the PDCCH is different from CORESET band configured by the base station, Option 3 described previously and the like.

The UE may perform PDCCH monitoring in at least one of the LBT subbands where the base station succeeds in LBT.

Figure 4:
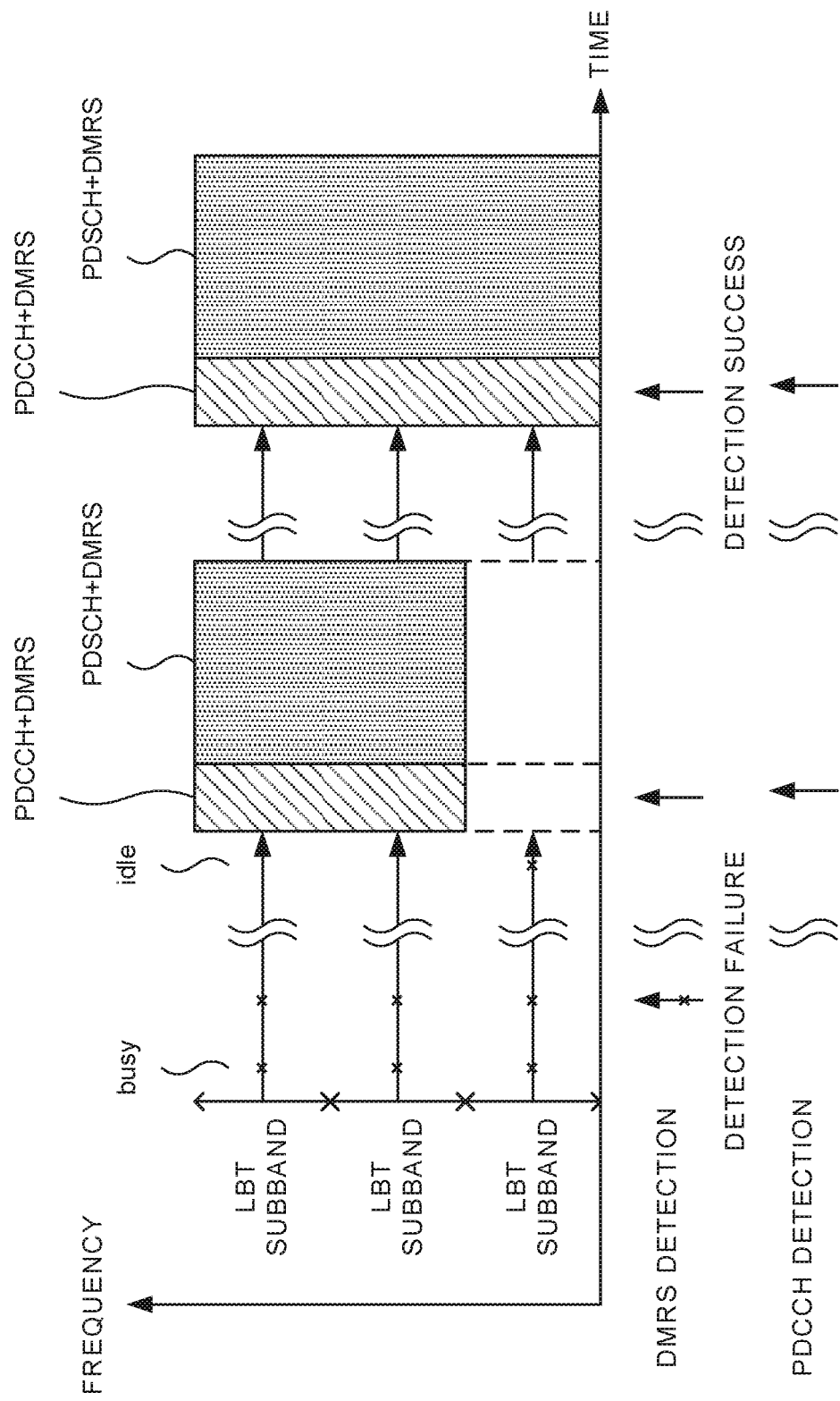
FIG. 4 is a diagram showing one example of UE operation according to Embodiment 2.

As shown in FIG. 4, the UE may perform DMRS detection with a particular periodicity. The particular periodicity may be defined by specifications, may be configured by higher layer signaling, or may be dependent on implementation. The particular periodicity may be designated by the number of symbols, or may be designated by the number of slots. The UE may perform DMRS detection within an active DL BWP or in a CORESET configured within the active DL BWP.

In the case where a level (power, correlation value, etc.) obtained by DMRS detection is a given threshold or more, the UE may determine that the DMRS is detected.

The UE may perform DMRS detection according to at least one of the following DMRS detecting methods 1 and 2.

«DMRS Detecting Method 1»

A UE may perform DMRS detection only in a particular LBT subband (primary subband) among a plurality of LBT subbands within an active DL BWP or in a CORESET configured within the active DL BWP.

The particular LBT subband may be defined by specifications, may be configured by higher layer signaling, or may be notified implicitly by another parameter (e.g., higher layer parameter). The UE may determine the particular LBT subband, based on another parameter and given rule. Indexes may be assigned to a plurality of LBT subbands within the active DL BWP or in the CORESET configured within the active DL BWP. The UE may recognize the particular LBT subband by the index.

The particular LBT subband may be an LBT subband including the center frequency of the active DL BWP or the CORESET configured within the active DL BWP. In the case of performing DL transmission within the active DL BWP, the base station may transmit the DMRS in at least the particular LBT subband. In the case where DL transmission is performed within the active DL BWP, the UE may assume that the DMRS is transmitted in the particular LBT subband. In the case where the LBT result in at least the particular LBT subband is idle, the base station may transmit the DMRS in one or more LBT subbands including the particular LBT subband. In other words, in the case where the LBT result in the particular LBT subband is busy, the base station may not perform DL transmission within the active DL BWP.

According to such a DMRS detecting method 1, since the UE does not need to perform DMRS detection in all LBT subbands, and is capable of suppressing loads.

«DMRS Detecting Method 2»

A UE may perform DMRS detection in all LBT subbands within an active DL BWP or in a CORESET configured within the active DL BWP.

The UE may perform DMRS detection for each LBT subband within the active DL BWP or in the CORESET configured within the active DL BWP (DMRS detecting method 2-1). The UE may perform DMRS detection for each candidate for combinations of one or more LBT subbands within the active DL BWP or in the CORESET configured within the active DL BWP (DMRS detecting method 2-2).

For example, it is assumed that LBT subbands A, B and C are included within the active DL BWP or in the CORESET configured within the active DL BWP.

In the case of using the DMRS detecting method 2-1, the UE may perform DMRS detection in each of the LBT subbands A, B and C. In this case, the UE may determine whether or not the DMRS exists independently for each LBT subband. As compared with the DMRS detecting method 2-2, since the number of candidates is low, the DMRS detecting method 2-1 is easy, and enables the load of the UE to be suppressed.

In the case of using the DMRS detecting method 2-2, the UE may perform DMRS detection, while assuming each of seven combination candidates of LBT subbands A, B, C, A+B, A+C, B+C and A+B+C. In this case, the UE determines the most likelihood among eight candidates of cases where the DMRS exists in any of seven combination candidates and the case where any transmission does not exist. As compared with the DMRS detecting method 2-1, the DMRS detecting method 2-2 enhances detection accuracy, and is capable of suppressing false detection (misdetection, false alarm, determining the presence in the case of actually not existing, determining the absence in the case of actually existing).

According to the DMRS detecting method 2, it is possible to flexibly perform DL transmission using an arbitrary combination of LBT subbands, and to improve usage efficiency of resources.

«PDCCH Detecting Method»

As shown in FIG. 4, in the case where a UE detects at least one DMRS in an active DL BWP, the UE may perform detection (PDCCH detection, blind detection of the PDCCH, PDCCH monitoring) of the PDCCH (at least one of the PDCCH and GC-PDCCH) in a part or the whole of LBT subbands among LBT subbands where DL transmission of the serving cell is assumed to exist based on the DMRS detection result.

The UE may perform PDCCH detection according to at least one of the following PDCCH detecting methods 1 to 3.

«PDCCH Detecting Method 1»

In the case where a UE performs PDCCH detection in an LBT subband different from an LBT subband where the DMRS is detected, or the case where it is assumed that false detection of a DMRS (misdetection, false alarm, determining the presence in the case of actually not existing, determining the absence in the case of actually existing) may occur, the UE needs to determine a subband to perform PDCCH detection.

Based on a sequence (DMRS sequence) of the detected DMRS, the UE may determine the subband to perform PDCCH detection.

The UE may try detection of a plurality of candidates for DMRS sequences in one or a plurality of LBT subbands. For example, using maximum likelihood detection (MLD) and the like, the UE may select a candidate with the highest correlation with the received signal from among the plurality of candidates.

Association of combinations (pattern) of LBT subbands or the number of LBT subbands to perform PDCCH detection with candidates for DMRS sequences may be defined by specifications or may be configured by higher layer signaling. The DMRS sequence may be identified by a sequence number, scrambling ID and the like. The LBT subband may be identified by a subband index, RB index, RB offset and the like. For each number of LBT subbands, the combination of LBT subbands to perform PDCCH detection may be defined by specifications.

The UE may perform PDCCH detection in the LBT subband associated with the detected DMRS sequence.

The PDCCH detecting method 1 may be applied to the DMRS detecting method 1, or may be applied to the DMRS detecting method 2.

According to the PDCCH detecting method 1, it is possible to flexibly configure the combination of LBT subbands to perform PDCCH detection. In the case of setting the number of LBT subbands to perform DMRS detection to be lower than the number of LBT subbands to perform PDCCH detection, it is possible to suppress loads of DMRS detection. Also in the case where false detection of the DMRS occurs in a part of LBT subbands, it is possible to perform PDCCH detection in a proper LBT subband.

«PDCCH Detecting Method 2»

A UE may perform PDCCH detection in an LBT subband where the DMRS is detected.

The PDCCH detecting method 2 may be applied to the DMRS detecting method 2.

According to the PDCCH detecting method 2, it is possible to flexibly perform DL transmission using an arbitrary combination of LBT subbands, and enhance usage efficiency of resources. The UE is capable of readily determining the LBT subband to perform PDCCH detection, and is capable of suppressing the load.

«PDCCH Detecting Method 3»

In the case of detecting at least one DMRS, the UE may perform PDCCH detection in a particular LBT subband (primary LBT subband), without being dependent on the LBT subband where the DMRS is detected.

The particular LBT subband may be defined by specifications, or may be configured by higher layer signaling. Indexes may be assigned to a plurality of LBT subbands within an active DL BWP or in a CORESET configured within the active DL BWP. The UE may recognize the particular LBT subband by the index.

The particular LBT subband may be an LBT subband including the center frequency of the active DL BWP or the CORESET configured within the active DL BWP. In the case where the base station performs DL transmission within the active DL BWP), the base station may transmit the DMRS at least in the particular LBT subband. In the case where DL transmission is performed within the active DL BWP, the UE may assume that the PDCCH is transmitted in the particular LBT subband. In the case where an LBT result is idle at least in the particular LBT subband, the base station may transmit the PDCCH in one or more LBT subbands including the particular LBT subband. In other words, in the case where the LBT result in the particular LBT subband is busy, the base station may not perform DL transmission within the active DL BWP.

The UE may not be notified of the LBT subband to perform PDCCH detection.

The PDCCH detecting method 3 may be applied to both the DMRS detecting methods 1 and 2.

According to the PDCCH detecting method 3, it is possible to prevent useless operation for PDCCH detection from being performed due to false detection of the DMRS. The UE performs PDCCH detection only in the particular LBT subband, and is capable of suppressing the load.

«PDCCH Mapping Method»

One PDCCH may be mapped to one LBT subband.

One PDCCH may be comprised of N control-channel elements (CCE). N may be one of "1", "2", "4", "8" and "16". One CCE may be comprised 6 resource-element groups (REG). One REG may be equivalent to one resource block (RE) in one symbol.

The UE may assume that one PDCCH does not cross the boundary of LBT subbands.

For example, in the case where the UE using the PDCCH detecting method 2 detects the DMRS false, the UE only fails to detect the PDCCH in the LBT subband where the DRMS is detected, and the case does not affect detection of the PDCCH in the other LBT subbands.

One DMRS sequence (at least one of the DRMS for PDCCH and the DMRS for PDSCH) may be mapped to one LBT subband. A length of the DMRS sequence used in the second downlink transmission method may be shorter than a length of the DMRS sequence used in the first downlink transmission method.

By mapping one DMRS sequence to one LBT subband, the UE is capable of performing detection of one DMRS only in one LBT subband, and is thereby capable of suppressing the load.

«Transmission Burst Configuration»

A transmission burst may include a particular signal (particular reference signal, particular RS) at the beginning. The particular RS may be the DMRS (at least one of the DMRS for PDCCH and the DMRS for PDSCH), or may be an RS different from the DMRS.

Since the PDCCH and PDSCH vary by an LBT result, the base station determines the contents of the PDCCH (DCI, for example, PDSCH resource allocation) corresponding to the LBT result, and therefore, needs a processing time between LBT and PDCCH transmission.

After a symbol of the particular RS, the base station may transmit at least one of the DMRS and the PDCCH. The base station may transmit at least one of the DMRS and the PDCCH in symbol subsequent to transmission of the particular RS having a particular time length.

At least one of the PDCCH and DMRS for the PDCCH may be subjected to Time Division Multiplex (TDM) with the particular RS.

The UE may perform at least one of DMRS detection and PDCCH detection after the symbol of the particular RS.

By transmitting the particular RS at the beginning of the transmission burst, the base station is capable of suppressing a delay from LBT to a transmission start of the transmission burst, and is thereby capable of reserving a processing time between LBT and PDCCH transmission.

According to Embodiment 2 as described above, the UE is capable of operating properly according to the second downlink transmission method. Further, according to the second downlink transmission method, as compared with the first downlink transmission method, it is possible to enhance usage efficiency of resources.

Embodiment 3

In the case where a UE is configured for a DL BWP wider than a given bandwidth (e.g., 20 MHz), the UE may determine which is applied to the DL BWP, the first downlink transmission method or the second downlink transmission method, based on at least one of notification (configuration) from the base station and UE capability information.

In the case where a UE is configured for a DL BWP wider than a given bandwidth (e.g., 20 MHz), the UE may receive configuration information (e.g., higher layer signaling) indicative of one of the first downlink transmission method and the second downlink transmission method.

A UE may report that the UE supports the second downlink transmission method as the UE capability information. The UE reporting that the second downlink transmission method is supported may receive configuration information indicative of the second downlink transmission method. In the case of not reporting that the supports the second downlink transmission method, the UE may not expect that the second downlink transmission method is used.

In the case of applying the second downlink transmission method, the configuration information may indicate one of the DMRS detecting methods 1 and 2, or may indicate one of the PDCCH detecting methods 1 to 3. In the case where the configuration information indicates the PDCCH detecting method 1, the configuration information may include information indicative of association of the DMRS sequence with the combination or the number of LBT subbands.

The UE which is notified that the first downlink transmission method is applied, or the UE which is not notified that the second downlink transmission method is applied may perform operation of Embodiment 1.

The UE which is notified that the second downlink transmission method is applied, or the UE which is not notified that the first downlink transmission method is applied may perform operation of Embodiment 2.

According to Embodiment 3 as described above, the UE is capable of operating according to the proper downlink transmission method.

(Radio Communication System)

A configuration of a radio communication system according to one Embodiment of the present disclosure will be described below. In the radio communication system, communication is performed by using one of radio communication methods according to the respective above-mentioned Embodiments of the disclosure or combination thereof.

Figure 5:
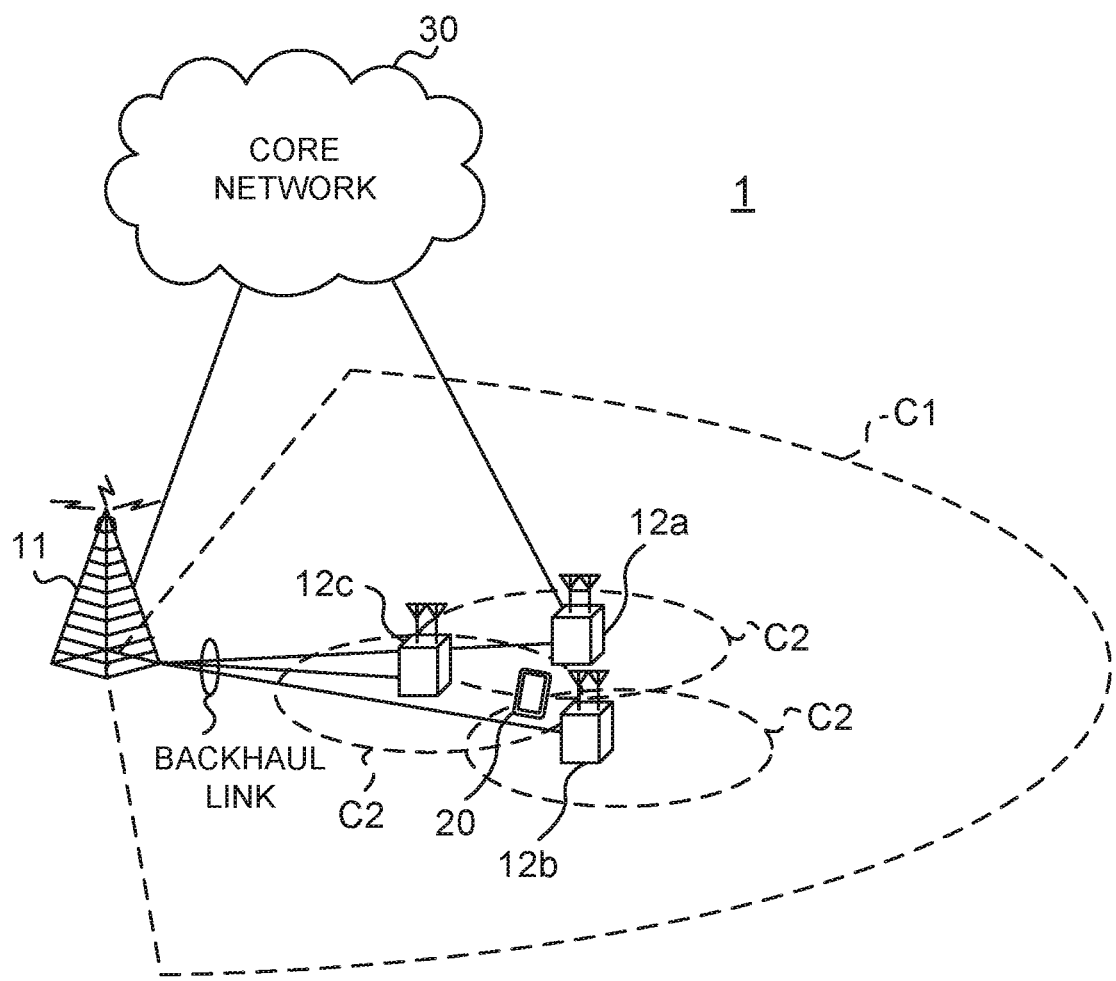
FIG. 5 is a diagram showing one example of a schematic configuration of a radio communication system according to one Embodiment.

FIG. 5 is a diagram showing one example of a schematic configuration of the radio communication system according to one Embodiment. The radio communication system 1 may be a system for actualizing communication using Long Term Evolution (LTE), 5th generation mobile communication system New Radio (5G NR) and the like specified by Third Generation Partnership Project (3GPP).

Further, the radio communication system 1 may support dual connectivity (Multi-RAT Dual Connectivity (MR-DC)) among a plurality of Radio Access Technologies (RAT). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and the like.

In EN-DC, a base station (eNB) of LTE (E-UTRA) is a master node (Master Node (MN)), and a base station (gNB) of NR is a secondary node (Secondary Node (SN)). In NE-DC, a base station (g-NB) of NR is an MN, and a base station (eNB) of LTE (E-UTRA) is an SN.

The radio communication system 1 may support dual connectivity (e.g., dual connectivity (NR-NR Dual Connectivity (NN-DC)) where both of the MN and SN are the base stations (gNB) of NR) among a plurality of base stations in the same RAT.

The radio communication system 1 may be provided with a base station 11 for forming a macrocell C1 with relatively wide coverage, and base stations 12 (12a to 12c) disposed inside the macrocell C1 to form small cells C2 narrower than the macrocell C1. A user terminal 20 may be positioned in at least one cell. The arrangement, numbers and the like of each cell and user terminal 20 are not limited to the aspect shown in the figure. Hereinafter, in the case of not distinguishing between the base stations 11 and 12, the stations are collectively called a base station 10.

The user terminal 20 may connect to at least one of a plurality of base stations 10. The user terminal 20 may use at least one of carrier aggregation (Carrier Aggregation (CA)) using a plurality of component carriers (Component Carrier (CC)) and dual connectivity (DC).

Each CC may be included in at least one of a first frequency band (Frequency Range 1 (FR1)) and second frequency band (Frequency Range 2 (FR2)). The macrocell C1 may be included in the FR1, and the small cell C2 may be included in the FR2. For example, the FR1 may be a frequency band (sub-6 GHz) of 6 GHz or less, and the FR2 may be a high frequency band (above-24 GHz) higher than 24 GHz. In addition, the frequency bands, definitions and the like of the FR1 and FR2 are not limited thereto, and for example, the FR1 may correspond to a frequency band higher than the FR2.

Further, in each CC, the user terminal 20 may perform communication using at least one of Time Division Duplex (TDD) and Frequency Division Duplex (FDD).

A plurality of base stations 10 may be connected by cables (e.g., optical fiber in conformity with Common Public Radio interface (CPRI), X2 interface, etc.), or by radio (e.g., NR communication). For example, in the case of using NR communication as backhaul between the base stations 11 and 12, the base station 11 corresponding to a higher station may be called an Integrated Access Backhaul (IAB) donor, and the base station 12 corresponding to a relay station (relay) may be called an IAB node.

The base station 10 may be connected to a core network 30 via another base station 10 or directly. For example, the core network 30 may include at least one of Evolved Packet Core (EPC), 5G Core Network (5GCN), Next Generation Core (NGC) and the like.

The user terminal 20 may be a terminal supporting at least one of communication schemes such as LTE, LTE-A, and 5G.

In the radio communication system 1, an Orthogonal Frequency Division Multiplexing (OFDM)-based radio access scheme may be used. For example, on at least one of downlink (Downlink (DL)) and uplink (Uplink (UL)) may be used Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA) and the like.

The radio access scheme may be called a waveform. In addition, in the radio communication system 1, another radio access scheme (e.g., another single carrier transmission scheme, another multi carrier transmission scheme) may be used for the radio access scheme of UL and DL.

As downlink channels, in the radio communication system 1 may be used a downlink shared channel (Physical Downlink Shared Channel (PDSCH)) shared by user terminals 20, broadcast channel (Physical Broadcast Channel (PBCH)), downlink control channel (Physical Downlink Control Channel (PDCCH)) and the like.

Further, as uplink channels, in the radio communication system 1 may be used an uplink shared channel (Physical Uplink Shared Channel (PUSCH)) shared by user terminals 20, uplink control channel (Physical Uplink Control Channel (PUCCH)), random access channel (Physical Random Access Channel (PRACH)) and the like.

User data, higher layer control information, System Information Block (SIB) and the like are transmitted on the PDSCH. The user data, higher layer control information and the like may be transmitted on the PUSCH. Further, Master Information Block (MIB) may be transmitted on the PBCH.

Lower layer control information may be transmitted on the PDCCH. For example, the lower layer control information may include downlink control information (Downlink Control Information (DCI)) including scheduling information of at least one of the PDSCH and PUSCH.

In addition, DCI for scheduling the PDSCH may be called a DL assignment, DL DCI and the like, and DCI for scheduling the PUSCH may be called a UL grant, UL DCI and the like. In addition, the PDSCH may be read with DL data, and the PUSCH may be read with UL data.

For detection of the PDCCH, a control resource set (COntrol REsource SET (CORESET)) and search space may be used. The CORESET corresponds to resources to search for the DCI. The search space corresponds to a search region and search method of PDCCH candidates. One CORESET may be associated with one or a plurality of search spaces. The UE may monitor the CORESET related to some search space based on search space configuration.

One search space may correspond to PDCCH candidates corresponding to one or a plurality of aggregation levels. One or a plurality of search spaces may be called a search space set. In addition, the "search space", "search space set", "search space configuration", "search space set configuration", "CORESET", "CORESET configuration" and the like of the present disclosure may be read with one another.

On the PUCCH may be transmitted uplink control information (Uplink Control Information (UCI)) including at least one of Channel State Information (CSI), receipt confirmation information (for example, which may be called Hybrid Automatic Repeat reQuest ACKnowledgement (HARQ-ACK), ACK/NACK and the like) and Scheduling Request (SR). A random access preamble to establish connection with the cell may be transmitted on the PRACH.

In addition, in the present disclosure, the downlink, uplink and the like may be expressed without attaching "link". Further, various channels may be expressed without attaching "Physical" at the beginning.

In the radio communication system may be transmitted a Synchronization Signal (SS), Downlink Reference Signal (DL-RS) and the like. As the DL-RS, in the radio communication system 1 may be transmitted a Cell-specific Reference Signal (CRS), Channel State Information Reference Signal (CSI-RS), demodulation reference signal (DeModulation Reference Signal (DMRS)), Positioning Reference Signal (PRS), Phase Tracking Reference Signal (PTRS) and the like.

For example, the synchronization signal may be at least one of a Primary Synchronization Signal (PSS) and Secondary Synchronization Signal (SSS). A signal block including the SS (PSS, SSS) and PBCH (and DMRS for the PBCH) may be called an SS/PBCH block, SS Block (SSB) and the like. In addition, the SS, SSB and the like may also be called the reference signal.

Further, in the radio communication system 1, a Sounding Reference Signal (SRS), demodulation reference signal (DMRS) and the like may be transmitted as an Uplink Reference Signal (UL-RS). In addition, the DMRS may be called a user terminal-specific reference signal (UE-specific Reference Signal).

(Base Station)

Figure 6:
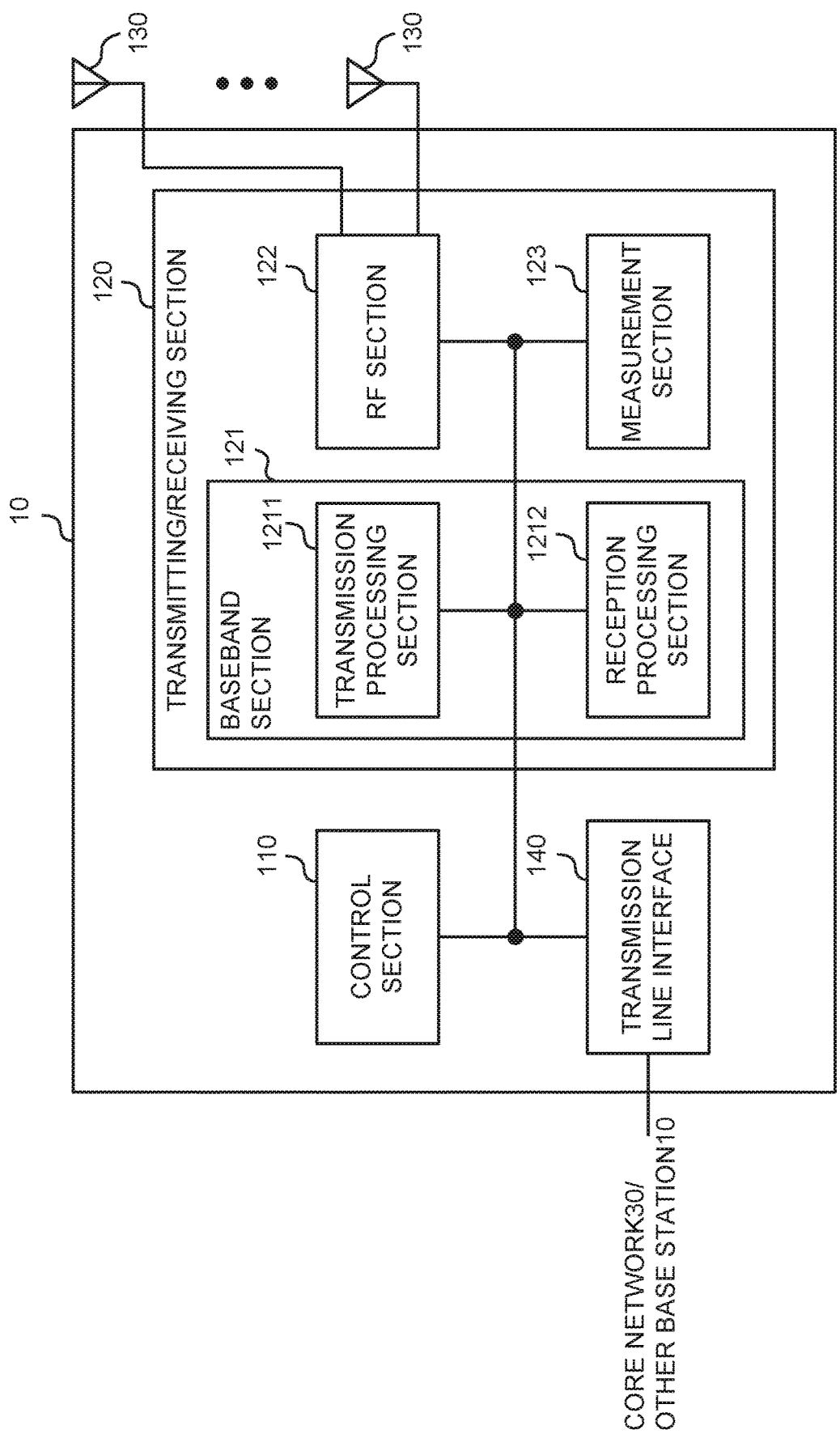
FIG. 6 is a diagram showing one example of a configuration of a base station according to one Embodiment.

FIG. 6 is a diagram showing one example of a configuration of the base station according to one Embodiment. The base station 10 is provided with a control section 110, transmitting/receiving section 120, transmitting/receiving antennas 130, and transmission line interface 140. In addition, the base station may be provided with one or more of each of the control section 110, transmitting/receiving section 120, transmitting/receiving antenna 130, and transmission line interface 140.

In addition, this example mainly illustrates function blocks of feature parts in this Embodiment, and the base station 10 may be assumed to have other function blocks required for radio communication. A part of processing of each section described below may be omitted.

The control section 110 performs control of the entire base station 10. The control section 110 is capable of being comprised of a controller, control circuit and the like explained based on common recognition in the technical field according to the present disclosure.

The control section 110 may control generation of signals, scheduling (e.g., resource allocation, mapping) and the like. The control section 110 may control transmission/reception, measurement and the like using the transmitting/receiving section 120, transmitting/receiving antenna 130 and transmission line interface 140. The control section 110 may generate data, control information, sequence and the like to transmit as a signal, and transfer the resultant to the transmitting/receiving section 120. The control section 110 may perform call processing (configuration, release, etc.) of a communication channel, state management of the base station 10, management of radio resources and the like.

The transmitting/receiving section 120 may include a baseband section 121, Radio Frequency (RF) section 122 and measurement section 123. The baseband section 121 may include a transmission processing section 1211 and reception processing section 1212. The transmitting/receiving section 120 is capable of being comprised of a transmitter/receiver, RF circuit, baseband circuit, filter, phase shifter, measurement circuit, transmitting/receiving circuit and the like explained based on the common recognition in the technical field according to the present disclosure.

The transmitting/receiving section 120 may be comprised as an integrated transmitting/receiving section, or may be comprised of a transmitting section and a receiving section. The transmitting section may be comprised of a transmission processing section 1211 and RF section 122. The receiving section may be comprised of a reception processing section 1212, RF section 122, and measurement section 123.

The transmitting/receiving antenna 130 is capable of being comprised of an antenna, for example, an array antenna and the like explained based on the common recognition in the technical field according to the present disclosure.

The transmitting/receiving section 120 may transmit the above-mentioned downlink channel, synchronization signal, downlink reference signal and the like. The transmitting/receiving section 120 may receive the above-mentioned uplink channel, uplink reference signal and the like.

The transmitting/receiving section 120 may form at least one of a transmission beam and reception beam, using digital beam forming (e.g., precoding), analog beam forming (e.g., phase rotation) and the like.

The transmitting/receiving section 120 (transmission processing section 1211) may perform, for example, on the data, control information and the like acquired from the control section 110, processing of Packet Data Convergence Protocol (PDCP) layer, processing (e.g., RLC retransmission control) of Radio Link Control (RLC) layer, processing (e.g., HARQ retransmission control) of Medium Access Control (MAC) layer and the like to generate a bit sequence to transmit.

The transmitting/receiving section 120 (transmission processing section 1211) may perform, on the bit sequence to transmit, transmission processing such as channel coding (which may include error correcting coding), modulation, mapping, filter processing, Discrete Fourier Transform (DFT) processing (as necessary), Inverse Fast Fourier Transform (IFFT) processing, precoding and digital-analog conversion, and output a baseband signal.

The transmitting/receiving section 120 (RF section 122) may perform modulation to a radio frequency band, filter processing, amplification and the like on the baseband signal to transmit a signal of the radio frequency band via the transmitting/receiving antenna 130.

On the other hand, the transmitting/receiving section 120 (RF section 122) may perform amplification, filter processing, demodulation to a baseband signal and the like on a signal of the radio frequency band received by the transmitting/receiving antenna 130.

The transmitting/receiving section 120 (reception processing section 1212) may apply reception processing such as analog-digital conversion, Fast Fourier Transform (FTT) processing, Inverse Discrete Fourier Transform (IDFT) processing (as necessary), filter processing, demapping, demodulation, decoding (which may include error correcting decoding), MAC layer processing, processing of RCL layer, and processing of PDCP layer to the acquired baseband signal, and acquire the user data, and the like.

The transmitting/receiving section 120 (measurement section 123) may perform measurement on a received signal. For example, based on the received signal, the measurement section 123 may perform Radio Resource Management (RRM) measurement, Channel State Information (CSI) measurement and the like. The measurement section 123 may measure received power (e.g., Reference Signal Received Power (RSRP)), received quality (e.g., Reference Signal Received Quality (RSRQ), Signal to Interference plus Noise Ratio (SINR), Signal to Noise Ratio (SNR)), signal strength (e.g., Received Signal Strength Indicator (RSSI)), propagation path information (e.g., CSI) and the like. The measurement result may be output to the control section 110.

The transmission line interface 140 may transmit/receive signals (backhaul signaling) to/from an apparatus included in the core network 30, another base station 10 and the like to perform acquisition, transmission and the like of user data (user plain data), control plain data and the like for the user terminal 20.

In addition, the transmitting section and receiving section of the base station 10 in the present disclosure may be comprised of at least one of the transmitting/receiving section 120 and transmitting/receiving antenna 130.

In a frequency band (e.g., NR-U target frequency, unlicensed band) to which sensing of the channel is applied, the control section 110 may determine one downlink transmission method from the first downlink transmission method (e.g., Option 2) where a band of monitoring for at least one of the reference signal (e.g., DMRS for PDCCH) and downlink control channel (e.g., PDCCH) is not changed based on the sensing, and the second downlink transmission method (e.g., Option 3) where the band of monitoring is changed based on the sensing, based on at least one of the configuration information (e.g., higher layer signaling) notified to the user terminal 20, and the capability information (e.g., UE capability information) reported from the user terminal 20. The transmitting/receiving section 120 may transmit the reference signal and downlink control channel according to the downlink transmission method.

(User Terminal)

Figure 7:
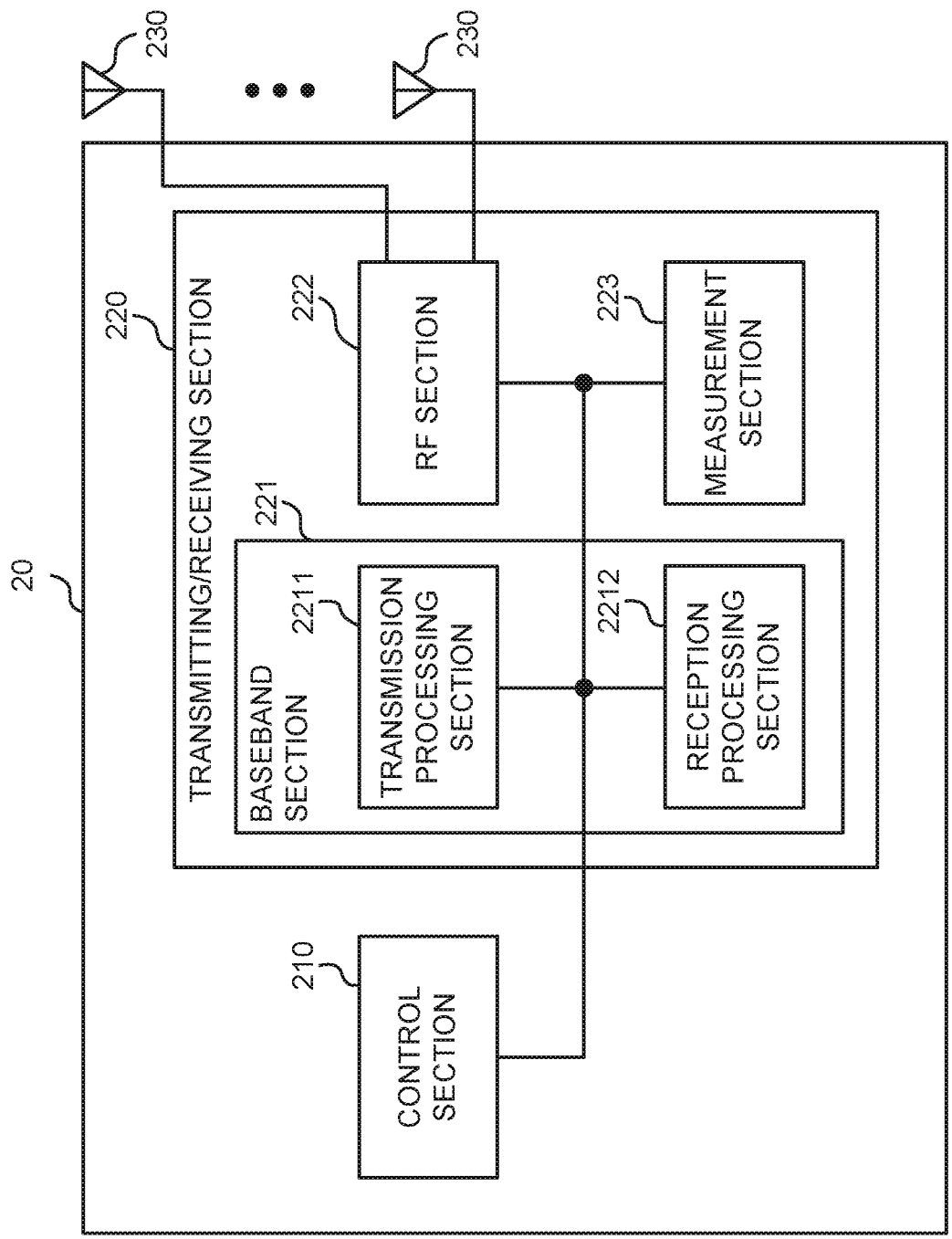
FIG. 7 is a diagram showing one example of a configuration of a user terminal according to one Embodiment.

FIG. 7 is a diagram showing one example of a configuration of the user terminal according to one Embodiment. The user terminal 20 is provided with a control section 210, transmitting/receiving section 220, and transmitting/receiving antennas 230. In addition, the user terminal may be provided with one or more of each of the control section 210, transmitting/receiving section 220 and transmitting/receiving antenna 230.

In addition, this example mainly illustrates function blocks of feature parts in this Embodiment, and the user terminal 20 may be assumed to have other function blocks required for radio communication. A part of processing of each section described below may be omitted.

The control section 210 performs control of the entire user terminal 20. The control section 210 is capable of being comprised of a controller, control circuit and the like explained based on the common recognition in the technical field according to the present disclosure.

The control section 210 may control generation of signals, mapping and the like. The control section 210 may control transmission/reception, measurement and the like using the transmitting/receiving section 220 and transmitting/receiving antenna 230. The control section 210 may generate data, control information, sequence and the like to transmit as a signal, and transfer the resultant to the transmitting/receiving section 220.

The transmitting/receiving section 220 may include a baseband section 221, RF section 222 and measurement section 223. The baseband section 221 may include a transmission processing section 2211 and reception processing section 2212. The transmitting/receiving section 220 is capable of being comprised of transmitter/receiver, RF circuit, baseband circuit, filter, phase shifter, measurement circuit, transmitting/receiving circuit and the like explained based on the common recognition in the technical field according to the present disclosure.

The transmitting/receiving section 220 may be comprised as an integrated transmitting/receiving section, or may be comprised of a transmitting section and a receiving section. The transmission section may be comprised of a transmission processing section 2211 and RF section 222. The receiving section may be comprised of a reception processing section 2212, RF section 222, and measurement section 223.

The transmitting/receiving antenna 230 is capable of being comprised of an antenna, for example, an array antenna and the like explained based on the common recognition in the technical field according to the present disclosure.

The transmitting/receiving section 220 may receive the above-mentioned downlink channel, synchronization signal, downlink reference signal and the like. The transmitting/receiving section 220 may transmit the above-mentioned uplink channel, uplink reference signal and the like.

The transmitting/receiving section 220 may form at least one of a transmission beam and reception beam, using digital beam forming (e.g., precoding), analog beam forming (e.g., phase rotation) and the like.

The transmitting/receiving section 220 (transmission processing section 2211) may perform, for example, on the data, control information and the like acquired from the control section 210, processing of PDCP layer, Processing (e.g., RLC retransmission control) of RLC layer, processing. (e.g., HARQ retransmission control) of MAC layer and the like to generate a bit sequence to transmit.

The transmitting/receiving section 220 (transmission processing section 2211) may perform, on the bit sequence to transmit, transmission processing such as channel coding (which may include error correcting coding), modulation, mapping, filter processing, DFT processing (as necessary), IFFT processing, precoding and digital-analog conversion, and output a baseband signal.

In addition, whether or not to apply the DFT processing may be based on configuration of transform precoding. In the case where transform precoding is enabled about some channel (e.g., PUSCH), the transmitting/receiving section 220 (transmission processing section 2211) may perform the DFT processing as the above-mentioned transmission processing so as to transmit the channel using a DFT-s-OFDM waveform. In the other case, the section may not perform the DFT processing as the above mentioned transmission processing.

The transmitting/receiving section 220 (RF section 222) may perform modulation to a radio frequency band, filter processing, amplification and the like on the baseband signal to transmit a signal of the radio frequency band via the transmitting/receiving antenna 230.

On the other hand, the transmitting/receiving section 220 (RF section 222) may perform amplification, filter processing, demodulation to a baseband signal and the like on a signal of the radio frequency band received by the transmitting/receiving antenna 230.

The transmitting/receiving section 220 (reception processing section 2212) may apply reception processing such as analog-digital conversion, FTT processing, IDFT processing (as necessary), filter processing, demapping, demodulation, decoding (which may include error correcting decoding), MAC layer processing, processing of RCL layer, and processing of PDCP layer to the acquired baseband signal, and acquire, the user data, and the like.

The transmitting/receiving section 220 (measurement section 223) may perform measurement on received signal. For example, based on the received signal, the measurement section 223 may perform RRM measurement, CSI measurement and the like. The measurement section 223 may measure received power (e.g., RSRP), received quality (e.g., RSRQ, SINR, SNR), signal strength (e.g., RSSI), propagation path information (e.g., CSI) and the like. The measurement result may be output to the control section 210.

In addition, the transmitting section and receiving section of the user terminal 20 in the present disclosure may be comprised of at least one of the transmitting/receiving section 220, transmitting/receiving antenna 230, and transmission line interface 240.

In a frequency band (e.g., NR-U target frequency, unlicensed band) to which sensing of the channel is applied, the control section 210 may determine at least one of a band (e.g., at least one LBT subband) of monitoring for at least one of the reference signal (e.g., DMRS for PDCCH) and downlink control channel (e.g., PDCCH) and operation of the monitoring, based on at least one of notified configuration information (e.g., higher layer signaling), and reported capability information (e.g., UE capability information). The transmitting/receiving section 220 may perform the monitoring according to the determination.

In the case where the band is different from a control resource set band for the downlink control channel (the second downlink transmission method is applied), at least one of the reference signal and the downlink control channel may be mapped to one of a plurality of subbands within the frequency band (e.g., active DL BWP).

In the case where the band is different from the control resource set band for the downlink control channel, the transmitting/receiving section 220 may receive a particular signal (e.g., particular RS) to perform the monitoring subsequently to a symbol of the particular signal.

In the case where the band is different from the control resource set band for the downlink control channel, the transmitting/receiving section 220 may perform monitoring of the reference signal in each of a plurality of subbands within the frequency band (e.g., DMRS detecting method 2).

In the case where the band is different from the control resource set band for the downlink control channel, the transmitting/receiving section 220 may perform the monitoring in a particular subband among a plurality of subbands within the frequency band (e.g., DMRS detecting method 1, PDCCH detecting methods 1 to 3).

(Hardware Configuration)

In addition, the block diagrams used in explanation of the above-mentioned Embodiments show blocks on a function-by-function basis. These function blocks (configuration sections) are actualized by any combination of at least one of hardware and software. Further, the method for actualizing each function block is not limited particularly. In other words, each function block may actualized using a single apparatus combined physically or logically, or two or more apparatuses that are separated physically or logically are connected directly or indirectly (e.g., using cable, radio, etc.), and each function block may be actualized using a plurality of these apparatuses. The function block may be actualized by combining the above-mentioned one apparatus or the above-mentioned plurality of apparatuses and software.

Herein, the function includes judging, determining, deciding, calculating, computing, processing, deriving, investigating, searching, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, assigning and the like, but is not limited thereto. For example, the function block (configuration section) having the function of transmitting may be called a transmitting unit, transmitter and the like. In any case, as described above, the actualizing method is not limited particularly.

Figure 8:
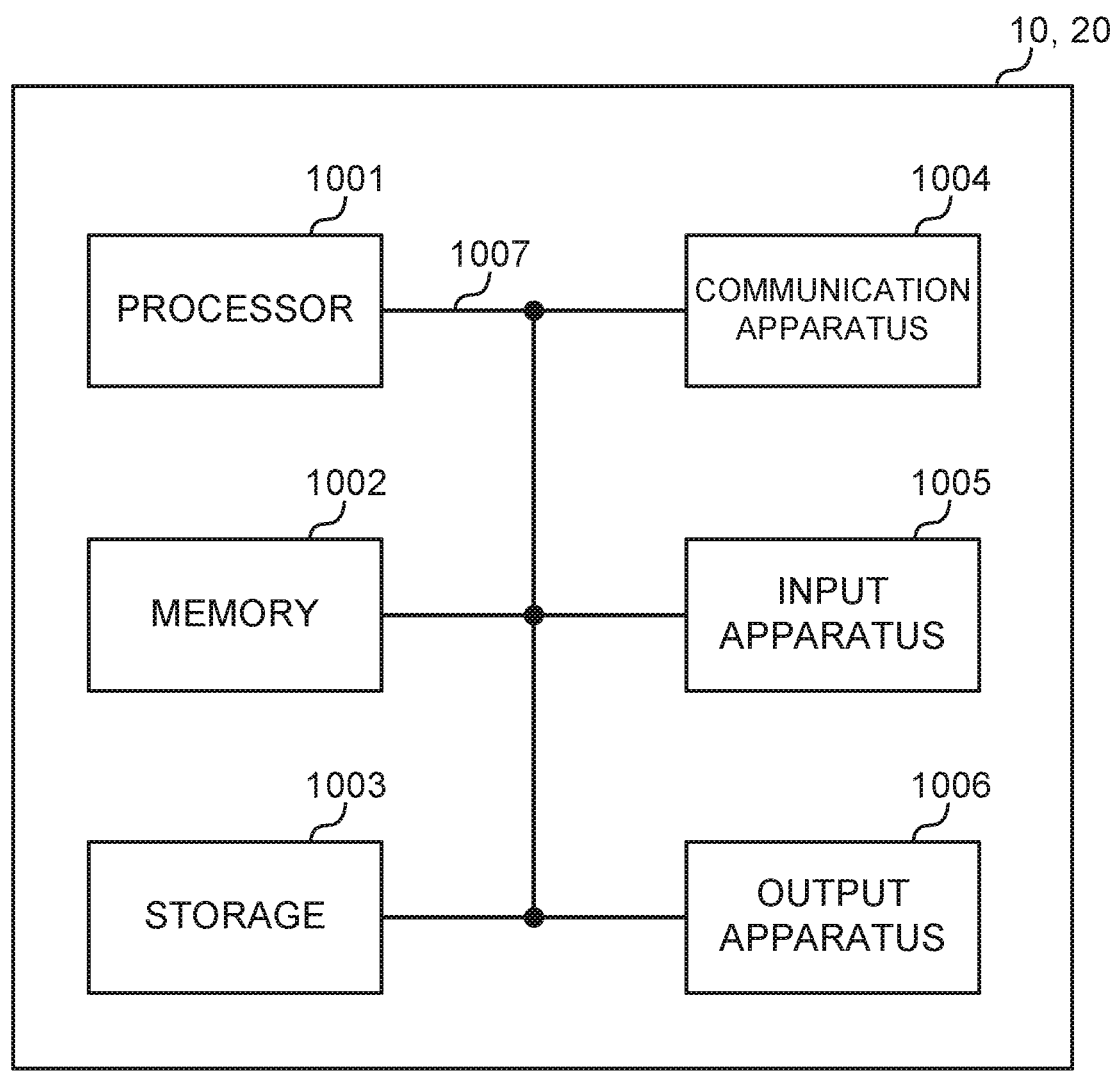
FIG. 8 is a diagram showing one example of hardware configurations of the base station and user terminal according to one Embodiment.

For example, each of the base station, user terminal and the like in one Embodiment of the present disclosure may function as a computer that performs the processing of the radio communication method of the disclosure. FIG. 8 is a diagram showing one example of a hardware configuration of each of the base station and user terminal according to one Embodiment. Each of the base station 10 and user terminal 20 as described above may be physically configured as computer apparatus including, processor 1001, memory 1002, storage 1003, communication apparatus 1004, input apparatus 1005, output apparatus 1006, bus 1007 and the like.

In addition, in the present disclosure, it is possible to read the letter of apparatus, circuit, device, section, unit and the like with one another. With respect to each apparatus shown in the figure, the hardware configuration of each of the base station 10 and the user terminal 20 may be configured so as to include one or a plurality of apparatuses, or may be configured without including a part of apparatuses.

For example, a single processor 1001 is shown in the figure, but a plurality of processors may exist. Further, the processing may be executed by a single processor, or may be executed by two or more processors at the same time, sequentially or using another technique. In addition, the processor 1001 may be implemented on one or more chips.

For example, each function in the base station 10 and user terminal 20 is actualized in a manner such that given software (program) is read on the hardware of the processor 1001, memory 1002 and the like, and that the processor 1001 thereby performs computations, and controls communication via the communication apparatus 1004, and at least one of read and write of data in the memory 1002 and storage 1003.

For example, the processor 1001 operates an operating system to control the entire computer. The processor 1001 may be comprised of a Central Processing Unit (CPU) including interfaces with peripheral apparatuses, control apparatus, computation apparatus, register and the like. For example, at least a part of the above-mentioned control section 110 (210), transmitting/receiving section 120 (220) and the like may be actualized by the processor 1001.

Further, the processor 1001 reads the program (program code), software module, data and the like on the memory 1002 from at least one of the storage 1003 and the communication apparatus 1004, and according thereto, executes various kinds of processing. Used as the program is a program that causes the computer to execute at least a part of operation described in the above-mentioned Embodiments. For example, the control section 110 (210) may be actualized by a control program stored in the memory 1002 to operate in the processor 1001, and the other function blocks may be actualized similarly.

The memory 1002 is a computer-readable storage medium, and for example, may be comprised of at least one of Read Only Memory (ROM), Erasable Programmable ROM (EPROM) Electrically EPROM (EEPROM), Random Access Memory (RAM) and other proper storage media. The memory 1002 may be called the register, cache, main memory (main storage apparatus) and the like. The memory 1002 is capable of storing the program (program code), software module and the like executable to implement the radio communication method according to one Embodiment of the present disclosure.

The storage 1003 is a computer-readable storage medium, and for example, may be comprised of at least one of a flexible disk, floppy (Registered Trademark) disk, magneto-optical disk (e.g., compact disk (Compact Disc ROM (CD-ROM), etc.), digital multi-purpose disk, (Registered Trademark) disk), removable disk, hard disk drive, smart card, flash memory device (e.g., card, stick, key drive), magnetic stripe, database, server and other proper storage media. The storage 1003 may be called an auxiliary storage apparatus.

The communication apparatus 1004 is hardware (transmitting/receiving device) to perform communication between computers via at least one of a wired network and a wireless network, and for example, is also referred to as a network device, network controller, network card, communication module and the like. For example, in order to actualize at least one of Frequency Division Duplex (FDD) and Time Division Duplex (TDD), the communication apparatus 1004 may be comprised by including a high-frequency switch, duplexer, filter, frequency synthesizer and the like. For example, the transmitting/receiving section 120 (220), transmitting/receiving antenna 130 (230) and the like as described above may be actualized by the communication apparatus 1004. The transmitting/receiving section 120 (220) may be made by physically or logically separated implementation using a transmitting section 120a (220a) and receiving section 120b (220b).

The input apparatus 1005 is an input device (e.g., keyboard, mouse, microphone, switch, button, sensor, etc.) that receives input from the outside. The output apparatus 1006 an output device (e.g., display, speaker, Light Emitting Diode (LED) lamp, etc.) that performs output to the outside. In addition, the input apparatus 1005 and output apparatus 1006 may be an integrated configuration (e.g., touch panel).

Further, each apparatus of the processor 1001, memory 1002 and the like is connected on the bus 1007 to communicate information. The bus 1007 may be configured using a single bus, or may be configured using different buses between apparatuses.

Furthermore, each of the base station 10 and user terminal 20 may be configured by including hardware such as a microprocessor, Digital Signal Processor (DSP), Application Specific Integrated Circuit (ASIC), Programmable Logic Device (PLD), and Field Programmable Gate Array (FPGA), or a part or the whole of each function block may be actualized using the hardware. For example, the processor 1001 may be implemented using at least one of the hardware.

(Modification)

In addition, the term explained in the present disclosure and the term required to understand the present disclosure may be replaced with a term having the same or similar meaning. For example, the channel, symbol and signal (or signaling) may be read with one another. Further, the signal may be a message. The reference signal is capable of being abbreviated as RS, and according to the standard to apply, may be called a pilot, pilot signal and the like. Furthermore, the component carrier (CC) may be called a cell, frequency carrier, carrier frequency and the like.

A radio frame may be comprised of one or plurality of frames in the time domain. The one or each of the plurality of frames constituting the radio frame may be called a subframe. Further, the subframe may be comprised of one or a plurality of slots in the time domain. The subframe may be a fixed time length (e.g., 1 ms) that is not dependent on numerology.

Herein, the numerology may be a communication parameter applied to at least one of transmission and reception of some signal or channel. For example, the numerology may indicate at least one of SubCarrier Spacing (SCS), bandwidth, symbol length, cyclic prefix length, Transmission Time interval (TTI), the number of symbols per TTI, radio frame configuration, particular filtering processing performed by a transmitter/receiver in the frequency domain, particular windowing processing performed by transmitter/receiver in the time domain and the like.

The slot may be comprised of one or a plurality of symbols (Orthogonal Frequency Division Multiplexing (OFDM) symbols, Single Carrier Frequency Division Multiple Access (SC-FDMA) symbols and the like) in the time domain. Further, the slot may a time unit based on numerology.

The slot may include a plurality of mini-slots. Each mini-slot may be comprised of one or a plurality of symbols in the time domain. Further, the mini-slot may be called a subslot. The mini-slot may be comprised of the number of symbols lower than the slot. A PDSCH (or PUSCH) transmitted in a time unit larger than the mini-slot may be called PDSCH (PUSCH) mapping type A. A PDSCH (or PUSCH) transmitted using the mini-slot may be called PDSCH (PUSCH) mapping type B.

Each of the radio frame, subframe, slot, mini-slot and symbol represents a time unit in transmitting a signal. For the radio frame, subframe, slot, mini-slot and symbol, another name corresponding to each of them may be used. The time units such as the frame, subframe, slot, mini-slot and symbol in the present disclosure may be read with one another.

For example, one subframe may be called TTI, a plurality of contiguous subframes may be called TTI, or one slot or one mini-slot may be called TTI. In other words, at least one of the subframe and TTI may be the subframe (1 ms) in existing LTE, may be a frame (e.g., 1 to 13 symbols) shorter than 1 ms, or may be a frame longer than 1 ms. In addition, instead of the subframe, the unit representing the TTI may be called the slot, mini-slot and the like.

Herein, for example, the TTI refers to a minimum time unit of scheduling in radio communication. For example, in the LTE system, the base station performs scheduling for allocating radio resources (frequency bandwidth, transmit power and the like capable of being used in each user terminal) to each user terminal in a TTI unit. In addition, the definition of the TTI is not limited thereto.

The TTI may be a transmission time unit of a data packet (transport block) subjected to channel coding, code block, codeword and the like, or may be a processing unit of scheduling, link adaptation and the like. In addition, when the TTI is given, a time segment (e.g., the number of symbols) to which the transport block, code block, codeword and the like are actually mapped may be shorter than the TTI.

In addition, when one slot or one mini-slot is called the TTI, one or more TTIs (i.e., one or more slots, or one or more mini-slots) may be the minimum time unit of scheduling. Further, the number of slots (the number of mini slots) constituting the minimum time unit of scheduling may be controlled.

The TTI having a time length of 1 ms may be called ordinary TTI (TTI in 3GPP Rel.8-12), normal TTI, long TTI, ordinary subframe, normal subframe, long subframe, slot and the like. The TTI shorter than the ordinary TTI may be called shortened TTI, short TTI, partial or fractional TTI, shortened subframe, short subframe, mini-slot, subslot, slot and the like.

In addition, the long TTI (e.g., ordinary TTI, subframe, etc.) may be read with TTI having a time length exceeding 1 ms, and the short TTI (e.g., shortened TTI, etc.) may be read with TTI having a TTI length of 1 ms or more and less than the TTI length of the long TTI.

The resource block (RB) is a resource allocation unit in the time domain and frequency domain, and may include one or a plurality of contiguous subcarriers in the frequency domain. The number of subcarriers contained in the RB may be the same irrespective of the numerology, and for example, may be "12". The number of subcarriers contained in the RB may be determined based on the numerology Further, the RB may include one or a plurality of symbols in the time domain, and may be a length of 1 slot, 1 mini-slot, 1 subcarrier, or 1 TTI. Each of 1 TTI, 1 subframe and the like may be comprised of one or a plurality of resource blocks.

In addition, one or a plurality of RBs may be called a physical resource block (Physical RB (PRB)), subcarrier group (Sub-Carrier Group (SCG)), Resource Element Group (REG), PRB pair, RB pair and the like.

Further, the resource block may be comprised of one or a plurality of resource elements (Resource Element (RE)). For example, 1 RE may be a radio resource region of 1 subcarrier and 1 symbol.

A Bandwidth Part (BWP) (which may be called a partial bandwidth, etc.) may represent a subset of contiguous common RBs (common resource blocks) for some numerology in some carrier. Herein, the common RB may be identified by an index of the RB with a common reference point of the carrier as reference. The PRB may be defined by some BWP, and may be numbered within the BWP.

The BWP may include UL BWP (BWP for UL) and DL BWP (BWP for DL). For a UE, one or a plurality of BWPs may be configured within one carrier.

At least one of configured BWPs may be active, and the UE may not assume that a given signal/channel is transmitted and received outside the active BWP. In addition, the "cell", "carrier" and the like in the present disclosure may be read with the "BWP".

In addition, structures of the above-mentioned radio frame, subframe, slot, mini-slot, symbol and the like are only illustrative. For example, it is possible to modify, in various manners, configurations of the number of subframes included in the radio frame, the number of slots per subframe or radio frame, the number of mini-slots included in the slot, the numbers of symbols and RBs included in the slot or mini-slot, the number of subcarriers included in the RB, the number of symbols within the TTI, the symbol length, the cyclic prefix (CP) length and the like.

Further, the information, parameter and the like explained in the present disclosure may be expressed using an absolute value, may be expressed using a relative value from a given value, or may be expressed using another corresponding information. For example, the radio resource may be indicated by a given index.

The names used in the parameter and the like in the present disclosure are not restrictive names in any respects. Further, equations and the like using these parameters may be different from those explicitly disclosed in the disclosure. It is possible to identify various channels (PUCCH, PDCCH, etc.) and information elements, by any suitable names, and therefore, various names assigned to these various channels and information elements are not restrictive names in any respects.

The information, signal and the like explained in the present disclosure may be represented by using any of various different techniques. For example, the data, order, command, information, signal, bit, symbol, chip and the like capable of being described over the entire above mentioned explanation may be represented by voltage, current, electromagnetic wave, magnetic field or magnetic particle, optical field or photon, or any combination thereof.

Further, the information, signal and the like are capable of being output at least one of from a higher layer to a lower layer, and from the lower layer to the higher layer. The information, signal and the like may be input and output via a plurality of network nodes.

The input/output information, signal and the like may be stored in a particular place (e.g., memory), or may be managed using a management table. The input/output information, signal and the like are capable of being rewritten, updated or edited. The output information, signal and the like may be deleted. The input information, signal and the like may be transmitted to another apparatus.

Notification of the information is not limited to the Aspect/Embodiment described in the present disclosure, and may be performed using another method. For example, notification of the information in the disclosure may be performed using physical layer signaling (e.g., Downlink Control information (DCI), Uplink Control Information (UCI)), higher layer signaling (e.g., Radio Resource Control (RRC) signaling, broadcast information (Master Information Block (MIB)), System Information Block (SIB) and the like), Medium Access Control (MAC) signaling), other signals, or combination thereof.

In addition, the physical layer signaling may be called Layer 1/Layer 2 (L1/L2) control information (L1/L2 control signal), L1 control information (L1 control signal) and the like. Further, the RRC signaling may be called RRC message, and for example, may be RRC connection setup (RRC Connection Setup) message, RRC connection reconfiguration (RRC Connection Reconfiguration) message, and the like. Furthermore, for example, the MAC signaling may be notified using MAC Control Element (MAC CE).

Further, notification of given information (e.g., notification of "being X") is not limited to explicit notification, and may be performed implicitly (e.g., notification of the given information is not performed, or by notification of different information).

The decision may be made with a value ("0" or "1") expressed by 1 bit, may be made with a Boolean value represented by true or false, or may be made by comparison with a numerical value (e.g., comparison with a given value).

Irrespective of that the software is called software, firmware, middle-ware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using at least one of wired techniques (coaxial cable, optical fiber cable, twisted pair, Digital Subscriber Line (DSL) and the like) and wireless techniques (infrared, microwave and the like), at least one of the wired technique and the wireless technique is included in the definition of the transmission medium.

The terms of "system" and "network" used in the present disclosure are capable of being used interchangeably. A "network" may mean an apparatus (e.g., base station) included in the network.

In the present disclosure, the terms of "precoding", "precoder", "weight (precoding weight)", "Quasi-Co-Location (QCL)", "Transmission Configuration Indication state (TCI state)", "spatial relation", "spatial domain filter", "transmit power", "phase rotation", "antenna port", "antenna port group", "layer", "the number of layers", "rank", "resource", "resource set", "resource group", "beam", "beam width", "beam angle", "antenna", "antenna element", "panel" and the like are capable of being used interchangeably.

In the present disclosure, the terms of "Base Station (BS)", "radio base station", "fixed station", "NodeB", "eNB (eNodeB)", "gNB (gNodeB)", "access point", "Transmission Point (TP)", "Reception Point (RP)", "Transmission/Reception Point (TRP)", "panel", "cell", "sector", "cell group", "carrier", "component carrier" and the like are capable of being used interchangeably. There is the case where the base station is called by the terms of macrocell, small cell, femto-cell, pico-cell and the like.

The base station is capable of accommodating one or a plurality of (e.g., three) cells. When the base station accommodates a plurality of cells, the entire coverage area of the base station is capable of being segmented into a plurality of smaller areas, and each of the smaller areas is also capable of providing communication services by a base station sub-system (e.g., small base station (Remote Radio Head (RRH)) for indoor use). The term of "cell" or "sector" refers to a part or the whole of coverage area of at least one of the base station and the base station sub-system that perform communication services in the coverage.

In the present disclosure, the terms of "Mobile Station (MS)", "user terminal", "User Equipment (UE)", "terminal" and the like are capable of being used interchangeably.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of the base station and the mobile station may be called a transmitting apparatus, receiving apparatus, radio communication apparatus and the like. In addition, at least one of the base station and the mobile station may be a device installed in mobile unit, mobile unit itself and the like. The mobile unit may be a vehicle (e.g., car, airplane, etc.), may be a mobile unit (e.g., drone, self-driving car, etc.) without human intervention, or may be a robot (crewed type or uncrewed type). In addition, at least one of the base station and the mobile station includes an apparatus that does always not move at the time of communication operation. For example, at least one of the base station and the mobile station may be an Internet of Things (IoT) device such as a sensor.

Further, the base station in the present disclosure may be read with the user terminal. For example, each Aspect/Embodiment of the disclosure may be applied to a configuration where communication between the base station and the user terminal replaced with communication among a plurality of user terminals (for example, which may be called Device-to-Device (D2D), Vehicle to-Everything (V2X), etc.). In this case, the functions that the above-mentioned base station 10 has may be the configuration that the user terminal 20 has. Further, the words of "up", "down" and the like may be read with a word (e.g., "side") that corresponds to Device-to-Device communication. For example, the uplink channel, downlink channel and the like may be read with a side channel.

Similarly, the user terminal in the present disclosure may be read with the base station. In this case, the functions that the above-mentioned user terminal 20 has may be the configuration that the base station 10 has.

In the present disclosure, operation performed by the base station may be performed by an upper node thereof in some case. In a network. In a network including one or a plurality of network nodes having the base station, it is obvious that various operations performed for communication with the terminal are capable of being performed by the base station, one or more network nodes (e.g., Mobility Management Entity (MME), Serving-Gateway (S-GW) and the like are considered, but the disclosure is not limited thereto) except the base station, or combination thereof.

Each Aspect/Embodiment explained in the present disclosure may be used alone, may be used in combination, or may be switched and used according to execution. Further, with respect to the processing procedure, sequence, flowchart and the like of each Aspect/Embodiment explained in the disclosure, unless there is a contradiction, the order may be changed. For example, with respect to the methods explained in the disclosure, elements of various steps are presented using illustrative order, and are not limited to the presented particular order.

Each Aspect/Embodiment explained in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (Registered Trademark)), CDMA 2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), system using another proper radio communication method, the next-generation system extended based thereon and the like. Further, a plurality of systems may be combined (e.g., combination of LTE or LTE-A and 5G, etc.) to apply.

The description of "based on" used in the present disclosure does not mean "based on only", unless otherwise specified. In other words, the description of "based on" means both of "based on only" and "based on at least".

Any references to elements using designations of "first", "second" and the like used in the present disclosure do not limit the amount or order of these elements overall. These designations are capable of being used in the disclosure as the useful method to distinguish between two or more elements. Accordingly, references of first and second elements do not mean that only two elements are capable of being adopted, or that the first element should be prior to the second element in any manner.

There is the case where the term of "determining" used in the present disclosure includes various types of operation. For example, "determining" may be regarded as "determining" judging, calculating, computing, processing, deriving, investigating, looking up (search, inquiry) (e.g., looking up in a table, database or another data structure), ascertaining and the like.

Further, "determining" may be regarded as "determining" receiving (e.g., receiving information), transmitting (e.g., transmitting information), input, output, accessing (e.g., accessing data in memory) and the like.

Furthermore, "determining" may be regarded as "determining" resolving, selecting, choosing, establishing, comparing and the like. In other words, "determining" may be regarded as "determining" some operation.

Still furthermore, "determining" may be read with "assuming", "expecting", "considering" and the like.

The "maximum transmit power" described in the present disclosure may mean a maximum value of transmit power, may mean the nominal UE maximum transmit power, or may mean "the rated UE maximum transmit power".

The terms of "connected" and "coupled" used in the present disclosure or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. For example, "connection" may be read with "access".

In the present disclosure, in the case where two elements are connected, it is possible to consider that two elements are mutually "connected" or "coupled", by using one or more electric wires, cable, print electric connection, etc. and as some non-limited and non-inclusive examples, electromagnetic energy having wavelengths in a radio frequency region, microwave region and light (both visible and invisible) region, or the like.

In the present disclosure, the term of "A and B are different" may mean that "A and B are different from each other". In addition, the term may mean that "each of A and B is different from C". The terms of "separate", "coupled" and the like may be interpreted in the same manner as "different".

In the case of using "include", "including", and modifications thereof in the present disclosure, as in the term of "comprising", these terms are intended to be inclusive. Further, the term of "or" used in the disclosure is intended to be not exclusive OR.

In the present disclosure, in the case where articles are added by translation, for example, as "a", "an" and "the" in English, the disclosure may include that nouns continued from these articles are in the plural.

As described above, the invention according to the present disclosure is described in detail, but it is obvious to a person skilled in the art that the invention according to the disclosure is not limited to the Embodiments described in the disclosure. The invention according to the disclosure is capable of being carried into practice as modified and changed aspects without departing from the subject matter and scope of the invention defined by the descriptions of the scope of the claims. Accordingly, the descriptions of the disclosure are intended for illustrative explanation, and do not provide the invention according to the disclosure with any restrictive meaning.

The invention claimed is:

1. A terminal comprising:
a processor that determines a band in frequency domain of monitoring for a reference signal and a downlink control channel, and determines operation of the monitoring, in a frequency band to which sensing of a channel is applied, based on received configuration information and transmitted capability information; and
a receiver that performs the monitoring according to the determined band and the determined operation,
wherein when the determined band is equal to a control resource set (CORESET) band configured by the received configuration information for the downlink control channel, the receiver performs the monitoring in the control resource set band, and
when the determined band is not equal to the configured CORESET band, the receiver performs the monitoring in each of a plurality of subbands within the determined band.

2. A radio communication method of a terminal, including:
determining a band in frequency domain of monitoring for a reference signal and a downlink control channel, and determining operation of the monitoring, in a frequency band to which sensing of a channel is applied, based on received configuration information and transmitted capability information; and
performing the monitoring according to the determined band and the determined operation,
wherein when the determined band is equal to a control resource set (CORESET) band configured by the received configuration information for the downlink control channel, the terminal performs the monitoring in the control resource set band, and
when the determined band is not equal to the configured CORESET band, the terminal performs the monitoring in each of a plurality of subbands within the determined band.

3. A base station comprising:
a processor that determines a band in frequency domain of transmission for a reference signal and a downlink control channel, and operation of the transmission, in a frequency band to which sensing of a channel is applied, based on transmitted configuration information and received capability information; and
a transmitter that performs the transmission according to the determined band,
wherein when the determined band is equal to a control resource set (CORESET) band configured by the transmitted configuration information for the downlink control channel, the transmitter performs the transmission in the control resource set band, and
when the determined band is not equal to the configured CORESET band, the transmitter performs the transmission in each of a plurality of subbands within the determined band.

4. A system comprising:
a processor that determines a band in frequency domain of monitoring for a reference signal and a downlink control channel, and determines operation of the monitoring, in a frequency band to which sensing of a channel is applied, based on received configuration information and transmitted capability information; and a receiver that performs the monitoring according to the determined band and the determined operation; and a base station that performs transmission for the reference signal and the downlink control channel, wherein when the determined band is equal to a control resource set (CORESET) band configured by the received configuration information for the downlink control channel, the receiver performs the monitoring in the control resource set band, and when the determined band is not equal to the configured CORESET band, the receiver performs the monitoring in each of a plurality of subbands within the determined band.

* * * * *